US012671023B2

(12) United States Patent     (10) Patent No.:   US 12,671,023 B2

Murashita et al.     (45) Date of Patent:    Jun. 30, 2026

(54) REACTOR, CONVERTER, AND POWER CONVERSION DEVICE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Masaya Murashita, Mie (JP); Kazuhiro Inaba, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 736 days.

(21) Appl. No.: 18/021,073

(22) PCT Filed: Aug. 2, 2021

(86) PCT No.: PCT/JP2021/028622
§ 371 (c)(1),
(2) Date: Feb. 13, 2023

(87) PCT Pub. No.: WO2022/044712
PCT Pub. Date: Mar. 3, 2022

(65) Prior Publication Data
US 2023/0298798 A1     Sep. 21, 2023

(30) Foreign Application Priority Data

Aug. 24, 2020    (JP) ................................. 2020-141156

(51) Int. Cl.
| | | |
|---|---|---|
| *H01F 27/28* | (2006.01) | |
| *H01F 27/24* | (2006.01) | |
| *H02M 7/537* | (2006.01) | |

(52) U.S. Cl.
CPC ............. *H01F 27/24* (2013.01); *H01F 27/28* (2013.01); *H02M 7/537* (2013.01)

(58) Field of Classification Search
CPC .... H01F 27/24; H01F 27/28; H01F 2003/106; H01F 37/00; H02M 7/537; H02M 3/003; H02M 7/003
(Continued)

(56) References Cited

U.S. PATENT DOCUMENTS

2004/0257190 A1* 12/2004 Peck ................... H01F 27/2847
                                                 336/212
2012/0146759 A1* 6/2012 Shibuya ................ H01F 27/255
                                                 336/221

(Continued)

FOREIGN PATENT DOCUMENTS

JP       S60-63918 U1    5/1985
JP       2000-182845 A    6/2000
(Continued)

OTHER PUBLICATIONS

International Search Report issued on Oct. 19, 2021 for WO 2022/044712 A1 (6 pages).

*Primary Examiner* — Shawki S Ismail
*Assistant Examiner* — Kazi S Hossain
(74) *Attorney, Agent, or Firm* — Venjuris, P.C.

(57)          ABSTRACT

A reactor is provided with a coil and a magnetic core. The magnetic core includes a first core and a second core formed into a θ shape by being combined in an X direction. The first core includes a first end core part, at least a part of a middle core part, at least parts of both side core parts including a (Continued)

first side core part and a second side core part. The second core includes a second end core part, a remaining part of the middle core part and remaining parts of the first and second side core parts. Each of the first and second side core parts of the first core has a tip surface. A surface of the second core has facing surfaces facing the tip surfaces. The tip surface has a first chamfered portion.

15 Claims, 18 Drawing Sheets

(58) Field of Classification Search
    USPC .................................. 336/221, 220, 83, 173
    See application file for complete search history.

(56)                     References Cited

U.S. PATENT DOCUMENTS

2017/0004920  A1*    1/2017   Pan ...................... H01F 27/2885
2017/0365387  A1*   12/2017   Kusawake .............. H01F 37/00
2018/0122550  A1     5/2018   Inaba
2018/0122552  A1*    5/2018   Sakaguchi ............ H01F 27/292

FOREIGN PATENT DOCUMENTS

JP          2002-270434  A       9/2002
JP          2011-023494  A       2/2011
JP           2011176253  A   *   9/2011
JP          2012-023090  A       2/2012
JP          2013-143454  A       7/2013

* cited by examiner

REACTOR, CONVERTER, AND POWER CONVERSION DEVICE

CROSS REFERENCE TO RELATED APPLICATIONS

This application is a national phase of PCT application No. PCT/JP2021/028622, filed on 2 Aug. 2021, which claims priority from Japanese patent application No. 2020-141156, filed on 24 Aug. 2020, all of which are incorporated herein by reference.

TECHNICAL FIELD

The present disclosure relates to a reactor, a converter, and a power conversion device.

BACKGROUND ART

Constituent components of a converter to be installed in a vehicle such as a hybrid or electric vehicle include a reactor. The reactor is provided with a coil and a magnetic core. FIGS. 5 to 8 of patent literature 1 show a reactor provided with one coil and a magnetic core formed by combining two E-shaped core pieces. This magnetic core is a so-called E-E type core. This magnetic core is formed into a θ shape by combining the both core pieces such that end surfaces of the core pieces are facing each other. The magnetic core includes end core parts, a middle core part and side core parts. The end core parts are arranged on end surface sides of the coil to sandwich the coil in an axial direction. The middle core part is arranged inside the coil. The side core parts are arranged outside the coil to sandwich the middle core part.

PRIOR ART DOCUMENT

Patent Document

Patent Document 1: JP No. 2016-201509 A

SUMMARY OF THE INVENTION

A reactor of the present disclosure includes a coil and a magnetic core, the magnetic core including a first core and a second core formed into a θ shape by being combined in an X direction, the first core including a first end core part, at least a part of a middle core part and at least parts of both side core parts including a first side core part and a second side core part, the second core including a second end core part, a remaining part of the middle core part and remaining parts of the first and second side core parts, the first end core part facing a first end surface of the coil, the second end core part facing a second end surface of the coil, the middle core part being arranged inside the coil, the first and second side core parts being arranged outside the coil to sandwich the middle core part, each of the first and second side core parts of the first core having a tip surface facing the second core, a surface of the second core having facing surfaces facing the tip surfaces, an outer side edge of the facing surface being located inwardly of an outer side edge of the tip surface in a Y direction or aligned with the outer side edge of the tip surface in the Y direction and an inner side edge of the facing surface and that of the tip surface being substantially aligned in the Y direction when the magnetic core is viewed from a Z direction, the tip surface having a first chamfered portion along the Z direction, the first chamfered portion including at least a first outer chamfered portion, out of the first outer chamfered portion connected to the outer side edge of the tip surface and a first inner chamfered portion connected to the inner side edge of the tip surface, a chamfer width of the first outer chamfered portion being larger than that of the first inner chamfered portion, the X direction being a direction along an axial direction of the middle core part, the Y direction being a parallel direction of the middle core part, the first side core part and the second side core part, and the Z direction being a direction orthogonal to both the X direction and the Y direction.

A converter of the present disclosure includes the reactor of the present disclosure.

A power conversion device of the present disclosure includes the converter of the present disclosure.

TECHNICAL PROBLEM

Figure 1:
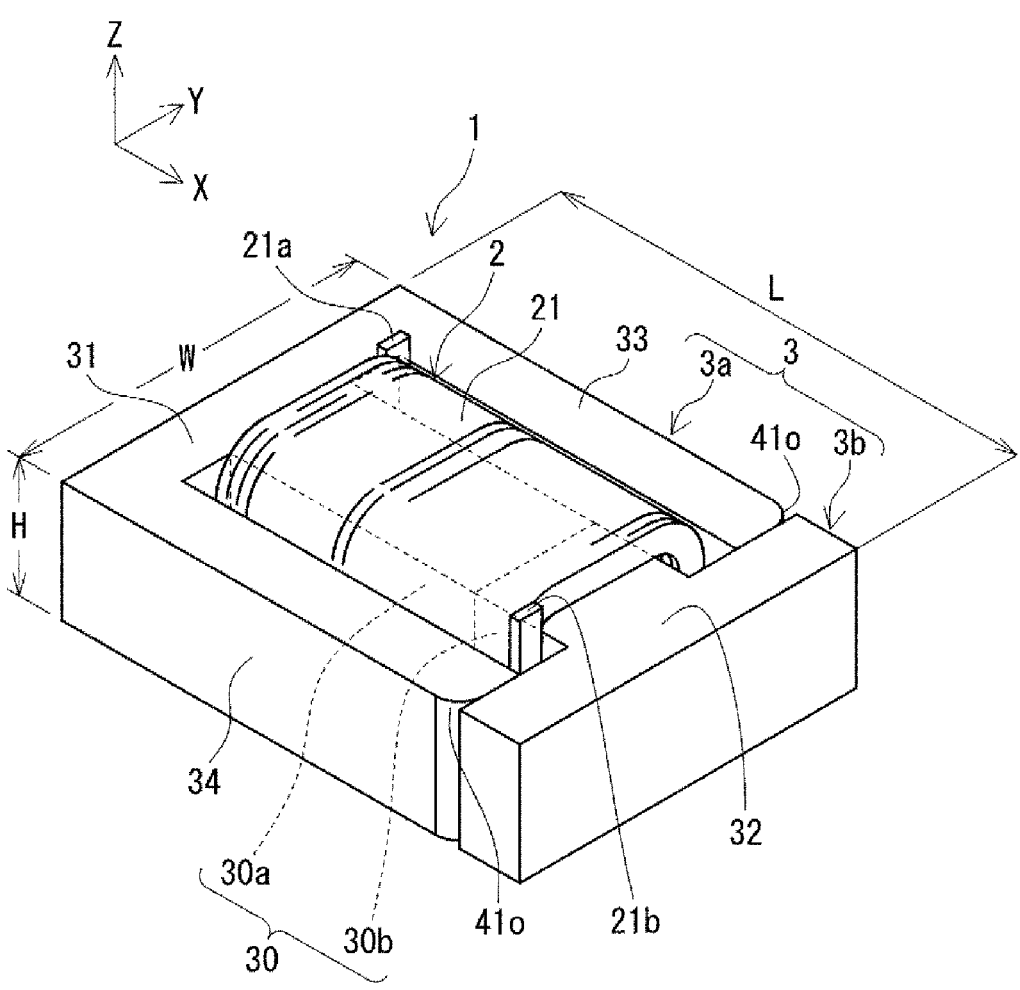
FIG. 1 is a perspective view showing an outline of an entire reactor according to a first embodiment.

It is required to reduce a loss of a reactor.

Accordingly, one object of the present disclosure is to provide a reactor capable of reducing a loss. Another object of the present disclosure is to provide a converter provided with the above reactor. Still another object of the present disclosure is to provide a power conversion device provided with the above converter.

Effect of Present Disclosure

The reactor of the present disclosure can reduce a loss. Further, the converter and the power conversion device of the present disclosure are excellent in efficiency.

DESCRIPTION OF EMBODIMENTS OF PRESENT DISCLOSURE

In a magnetic core including an E-shaped core piece, the E-shaped core piece includes at least parts of both side core parts. Each side core part of the E-shaped core piece has a tip surface facing another core piece. The other core piece has facing surfaces facing the tip surfaces. The tip surface is brought into contact with a partial region of the facing surface. Generally, the tip surface of each side core part is provided with a chamfered portion. The chamfered portion is formed on the tip surface for the molding of the core piece and other reasons. Normally, the chamfered portion is symmetrically formed on both outer and inner side edges of the tip surface. The outer side edge of the tip surface is an edge distant from the middle core part, out of edges constituting the tip surface. The inner side edge of the tip surface is an edge near the middle core part, out of the edges constituting the tip surface.

If the chamfered portion is symmetrically provided on the both outer and inner side edges on the tip surface of the side core part, it may affect a flow of a magnetic flux. Particularly, if the large chamfered portion is formed on the inner side edge of the tip surface, the flow of the magnetic flux is hindered between the tip surface and the facing surface. Therefore, a loss is easily caused since a flow of a magnetic flux is hindered in the magnetic core in the conventional reactor.

The reactor of the present disclosure was developed on the basis of the above problem.

First, embodiments of the present disclosure are listed and described.

(1) A reactor according to an embodiment of the present disclosure includes a coil and a magnetic core, the magnetic core including a first core and a second core formed into a θ shape by being combined in an X direction, the first core including a first end core part, at least a part of a middle core part and at least parts of both side core parts including a first side core part and a second side core part, the second core including a second end core part, a remaining part of the middle core part and remaining parts of the first and second side core parts, the first end core part facing a first end surface of the coil, the second end core part facing a second end surface of the coil, the middle core part being arranged inside the coil, the first and second side core parts being arranged outside the coil to sandwich the middle core part, each of the first and second side core parts of the first core having a tip surface facing the second core, a surface of the second core having facing surfaces facing the tip surfaces, an outer side edge of the facing surface being located inwardly of an outer side edge of the tip surface in a Y direction or aligned with the outer side edge of the tip surface in the Y direction and an inner side edge of the facing surface and that of the tip surface being substantially aligned in the Y direction when the magnetic core is viewed from a Z direction, the tip surface having a first chamfered portion along the Z direction, the first chamfered portion including at least a first outer chamfered portion, out of the first outer chamfered portion connected to the outer side edge of the tip surface and a first inner chamfered portion connected to the inner side edge of the tip surface, a chamfer width of the first outer chamfered portion being larger than that of the first inner chamfered portion, the X direction being a direction along an axial direction of the middle core part, the Y direction being a parallel direction of the middle core part, the first side core part and the second side core part, and the Z direction being a direction orthogonal to both the X direction and the Y direction.

The reactor can reduce a loss. The reason for that is that a flow of a magnetic flux is less likely to be hindered than in a comparison core. The comparison core means a core having the same specifications as the first core of the reactor except that a tip surface has a first outer chamfered portion and a first inner chamfered portion and a chamfer width of the first outer chamfered portion and that of the first inner chamfered portion are equal.

Note that the "outer side edge of the facing surface being located inwardly of the outer side edge of the tip surface in the Y direction" in the reactor means that the outer side edge of the facing surface is shifted inwardly in the Y direction from the outer side edge of the tip surface. Further, the "outer side edge of the facing surface is aligned with the outer side edge of the tip surface in the Y direction" means that the outer side edge of the facing surface and the outer side edge of the tip surface are not shifted in the Y direction.

The tip surfaces are end surfaces in the X direction of the first and second side core parts of the first core. The facing surface is a surface facing the tip surface of the first core, out of the surface of the second core. The tip surface of the first core is brought into contact with a partial region of the facing surface of the second core. When a magnetic flux flows in the magnetic core, the magnetic flux becomes denser in an inner region in the Y direction in each side core part, whereas the magnetic flux becomes sparser toward an outer region in the Y direction. When the magnetic flux flows between the tip surface of the first core and the facing surface of the second core, the magnetic flux flowing on the outer side of the side core part detours due to the outer chamfered portion if the outer chamfered portion is formed on the tip surface. However, since little magnetic flux flows on the outer side in the first place, the magnetic flux detouring due to the outer chamfered portion is little. Thus, even if the chamfer width of the outer chamfered portion is large, it hardly affects the magnetic flux flowing in the first and second cores. Further, if the inner chamfered portion is formed on the tip surface, the magnetic flux flowing on the inner side of the side core part detours due to the inner chamfered portion. In the reactor, the chamfer width of the first inner chamfered portion is smaller than that of the first outer chamfered portion. Thus, little magnetic flux detours due to the inner chamfered portion. Thus, the magnetic flux flowing on the inner side relatively smoothly flows between the first and second cores. Therefore, a loss can be reduced since the flow of the magnetic flux is hardly hindered between the first and second cores.

In contrast, in the comparison core, the chamfer width of the first inner chamfered portion is equal to that of the first outer chamfered portion and is large to a certain extent. Thus, a magnetic flux flowing on an inner side of a side core part largely detours due to the inner chamfered portion. Therefore, a loss is caused since the flow of the magnetic flux is hindered between the first and second cores.

Further, in the reactor, a weight reduction of the magnetic core can be expected. This is because the larger the chamfer width of the first outer chamfered portion, the smaller the volume of the first core. Thus, the magnetic core can be reduced in weight since the weight of the first core is reduced. Therefore, a weight reduction of the reactor can be achieved.

(2) As one aspect of the reactor, the chamfer width of the first outer chamfered portion is 10% or more and 45% or less of a width in the Y direction of the tip surface.

In the above aspect, the magnetic core is easily reduced in weight since the chamfer width of the first outer chamfered portion is 10% or more of the width of the tip surface. Further, a loss is easily reduced in the above aspect. This is because a contact area of the tip surface and the facing surface is easily secured since the chamfer width of the first outer chamfered portion is 45% or less of the width of the tip surface. By securing the contract area of the tip surface and the facing surface, the magnetic flux easily flows between the first and second cores. Thus, the loss is easily reduced.

(3) As one aspect of the reactor, the chamfer width of the first inner chamfered portion is 12.5% or less of the width in the Y direction of the tip surface.

In the above aspect, a loss is easily effectively reduced. Since the chamfer width of the first inner chamfered portion is 12.5% or less of the width of the tip surface, the detour of the magnetic flux due to the first inner chamfered portion is easily suppressed. Thus, the occurrence of the loss due to a hindered flow of the magnetic flux between the first and second cores is easily suppressed. Further, if the chamfer width of the first inner chamfered portion is 12.5% or less of the width of the tip surface, the contact area of the tip surface and the facing surface is easily secured. By securing the contact area of the tip surface and the facing surface, the magnetic flux easily flows between the first and second cores. Therefore, the loss can be effectively reduced.

(4) As one aspect of the reactor, the chamfer width of the first inner chamfered portion is 2 mm or less.

In the above aspect, a loss is easily effectively reduced. Since the chamfer width of the first inner chamfered portion is 2 mm or less, the detour of the magnetic flux due to the first inner chamfered portion is easily suppressed. Thus, the occurrence of the loss due to a hindered flow of the magnetic flux between the first and second cores is easily suppressed.

(5) As one aspect of the reactor, the first outer chamfered portion is roundly chamfered.

In the above aspect, the chip-off of the outer side edge of the tip surface is easily suppressed. If being roundly chamfered, the first outer chamfered portion is hardly chipped off since there is no corner.

(6) As one aspect of the reactor, the first core is a compact of a composite material, a soft magnetic powder being dispersed in a resin in the composite material, and the second core is a powder compact made of a raw powder containing a soft magnetic powder.

In this aspect, a predetermined inductance is easily obtained. This is because magnetic properties of the entire magnetic core can be adjusted by the magnetic core including the compact of the composite material having a lower relative magnetic permeability than the powder compact. Further, in this aspect, the magnetic properties of the entire magnetic core can be adjusted even if the magnetic core is not provided with a gap part. Since it is not necessary to provide the magnetic core with the gap part, a leakage magnetic flux from the gap part can be suppressed. Thus, a loss due to the leakage magnetic flux can be reduced.

(7) As one aspect of the reactor, a relative magnetic permeability of the first core is 5 or more and 50 or less.

In this aspect, the predetermined inductance is easily obtained.

(8) As one aspect of the reactor, a relative magnetic permeability of the second core is 50 or more and 500 or less.

In this aspect, the predetermined inductance is easily obtained.

(9) As one aspect of the reactor, the relative magnetic permeability of the second core is higher than that of the first core.

In the above aspect, the predetermined inductance is easily obtained. This is because magnetic properties of the entire magnetic core can be adjusted since the first and second cores have different magnetic properties, specifically the relative magnetic permeability of the second core is higher than that of the first core. Further, in the above aspect, the magnetic properties of the entire magnetic core can be adjusted even if the magnetic core includes no gap part. Since it is not necessary to provide the magnetic core with a gap part, a leakage magnetic flux from the gap part can be suppressed. Therefore, a loss due to the leakage magnetic flux can be reduced.

Further, in the above aspect, the width of the facing surface of the second core can be made shorter than that of the tip surface of the first core while electromagnetic performance is maintained. A weight reduction can be achieved as described later by making the width of the facing surface of the second core shorter than that of the tip surface of the first core. The electromagnetic performance can be maintained even if the width of the facing surface of the second core is shorter than that of the tip surface of the first core because the relative magnetic permeability of the second core is higher than that of the first core. If the width of the facing surface of the second core is shorter than that of the tip surface of the first core, a magnetic path area of the magnetic core is locally reduced in a contact part of the tip surface and the facing surface. Since the respective relative magnetic permeabilities of the second and first cores satisfy the above relationship, a magnetic flux which can pass between the tip surface and the facing surface is easily balanced. In other words, a balance of the magnetic flux can be substantially maintained between the first and second cores. If the first and second cores have the same relative magnetic permeability, but an area of the facing surface is smaller than that of the tip surface, the magnetic flux flowing in the second core becomes smaller than that flowing in the first core near the contact part of the tip surface and the facing surface. If the first and second cores have different relative magnetic permeabilities although the area of the facing surface is smaller than that of the tip surface, an influence on the magnetic flux flowing in the first and second cores is minor if the magnetic flux is in a substantially balanced range. Thus, due to a high relative magnetic permeability of the second core, the electromagnetic performance such as an inductance can be maintained even if the width of the facing surface of the second core is short. The width of the tip surface or that of the facing surface is a length along the Y direction of each surface and is equal to a distance in the Y direction between the outer and inner side edges of the tip surface or facing surface.

(10) As one aspect of the reactor, the outer side edge of the facing surface is located inwardly in the Y direction of the outer side edge of the tip surface, and a width in the Y direction of the facing surface is shorter than a width in the Y direction of the tip surface.

In the above aspect, a weight reduction can be achieved. The reason for that is that the volume of the second core can be reduced. In the above aspect, the outer side edge of the facing surface of the second core is located inwardly in the Y direction of the outer side edge of the tip surface of the first core, and the width of the facing surface is shorter than that of the tip surface. If the tip surface and the facing surface satisfy such a positional relationship, an outer width of the second core is narrower than that of the first core. Thus, the volume of the second core can be reduced. Thus, the magnetic core can be reduced in weight since the weight of the second core is reduced. The outer width of the first core or that of the second core is a maximum length along the Y direction of the first core or second core. The outer width of the first core or that of the second core is typically equivalent to a width, i.e. a length in the Y direction, of the first end core part or second end core part.

(11) As one aspect of the reactor of (10) described above, the width in the Y direction of the facing surface is 60% or more and 92% or less of the width in the Y direction of the tip surface.

In the above aspect, a weight reduction is easily achieved while electromagnetic performance is maintained. The electromagnetic performance can be maintained because the contact area of the tip surface and the facing surface is easily secured since the width of the facing surface is 60% or more of the width of the tip surface. By securing the contact area of the tip surface and the facing surface, the magnetic flux is easily balanced between the tip surface and the facing surface. That is, since a balance of the magnetic flux can be substantially maintained between the first and second cores, the electromagnetic performance such as an inductance is easily maintained. The weight reduction can be achieved because the width of the facing surface is sufficiently short since the width of the facing surface is 92% or less of the width of the tip surface. Since the width of the facing surface is sufficiently short, the weight of the second core can be effectively reduced.

(12) As one aspect of the reactor, the facing surface has a second chamfered portion along the Z direction, the second chamfered portion includes at least a second outer chamfered portion, out of the second outer chamfered portion connected to the outer side edge of the facing surface and a second inner chamfered portion connected to the inner side edge of the facing surface, and a chamfer width of the second outer chamfered portion is larger than that of the second inner chamfered portion.

In the aspect, the occurrence of a loss is easily suppressed. This is because a flow of a magnetic flux is hardly hindered between the first and second cores. Further, in the above aspect, a weight reduction of the magnetic core can be expected. This is because the volume of the second core is reduced since the facing surface has the second chamfered portion. Thus, the magnetic core can be reduced since the weight of the second core is reduced. Therefore, a weight reduction of the reactor can be achieved.

(13) As one aspect of the reactor, the first core includes each of the first and second side core parts entirely, and the facing surfaces are provided on the second end core part of the second core.

In this aspect, the magnetic core of an E-T type or E-I type is typically obtained.

(14) As one aspect of the reactor, the first core includes a part of each of the first and second side core parts, and the facing surface is provided on the remaining part of each of the first and second side core parts of the second core.

In this aspect, the magnetic core of an E-E type or E-U type is typically obtained.

(15) A converter according to an embodiment of the present disclosure includes the reactor of any one of (1) to (14) described above.

The converter is excellent in efficiency since including the above reactor. This is because the efficiency is improved due to a low loss of the reactor.

(16) A power conversion device according to an embodiment of the present disclosure includes the converter of (15) described above.

The power conversion device is excellent in efficiency since including the above converter. This is because the efficiency is improved due to a low loss of the reactor in the converter.

Details of Embodiments of Present Disclosure

Specific embodiments of the present disclosure are described below with reference to the drawings. The same reference signs in figures denote the same components. Note that the present invention is not limited to these illustrations and is represented by claims and intended to include all changes in the scope of claims and in the meaning and scope of equivalents.

First Embodiment

[Reactor]

Figure 2:
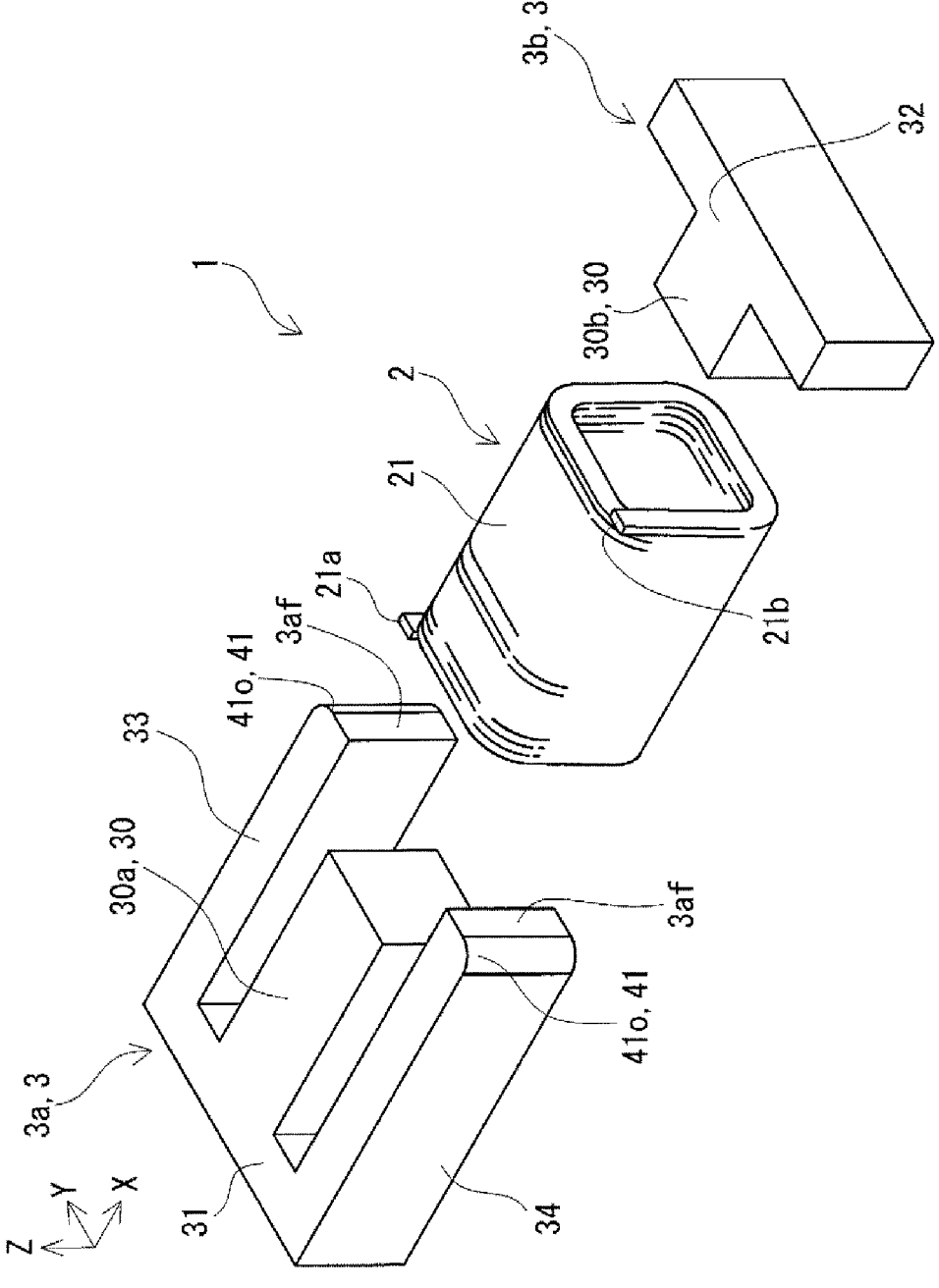
FIG. 2 is a perspective view showing an outline of the reactor according to the first embodiment in a disassembled state.
Figure 3:
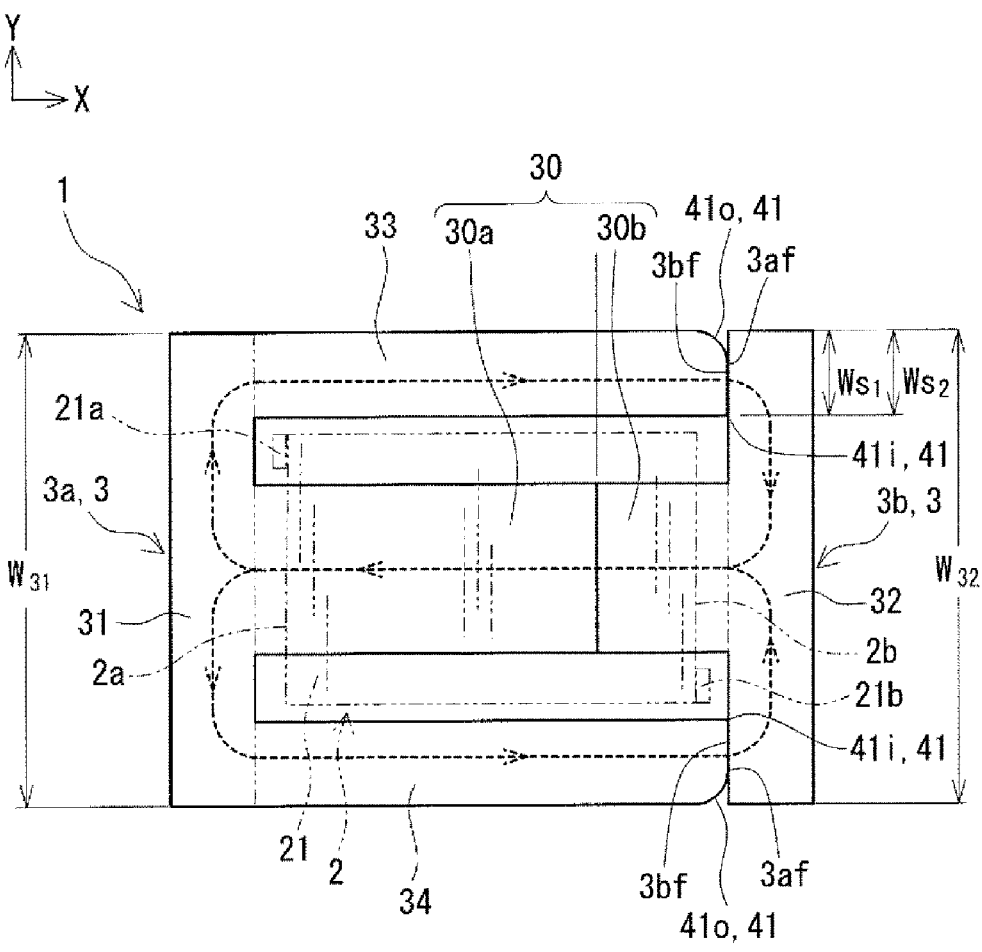
FIG. 3 is a top view showing the outline of the entire reactor according to the first embodiment.

A reactor 1 of a first embodiment is described with reference to FIGS. 1 to 4. As shown in FIGS. 1 and 2, the reactor 1 includes a coil 2 and a magnetic core 3. The magnetic core 3 includes a first core 3a and a second core 3b. As shown in FIG. 3, the magnetic core 3 is formed into a θ shape as a whole by combining the first and second cores 3a, 3b. The first core 3a has tip surfaces 3af to be described later. The second core 3b has facing surfaces 3bf facing the tip surfaces 3af.

One of features of the reactor 1 of this embodiment is to satisfy the following requirements (a) to (d).

(a) The tip surface 3af of the first core 3a and the facing surface 3bf of the second core 3b are in a specific positional relationship.

(b) The tip surface 3af has a first chamfered portion 41.

(c) The first chamfered portion 41 includes at least a first outer chamfered portion 41o.

(d) A chamfer width of the first outer chamfered portion 41o is larger than that of a first inner chamfered portion 41i.

The configuration of the reactor 1 is described in detail below. The coil 2 is shown by a two-dot chain line for the convenience of description in FIG. 3. This point applies also to FIGS. 9, 10 and 16 respectively referred to in second to fourth embodiments to be described later.

(Coil)

As shown in FIGS. 1 and 2, the coil 2 includes one winding portion 21. The winding portion 21 is formed by spirally winding a winding wire. A known winding wire can be used as the winding wire. In this embodiment, the winding wire is a coated rectangular wire. A conductor of the winding wire is constituted by a rectangular wire made of copper. An insulation coating of the coated rectangular wire is made of enamel. The coil 2 is an edgewise coil formed by winding the coated rectangular wire in an edgewise manner.

The winding portion 21 of this embodiment has a rectangular tub shape. Rectangular shapes include square shapes. That is, the end surface shape of the winding portion 21 is a rectangular frame shape. The winding portion 21 may have a hollow cylindrical shape. Since the winding portion 21 has a rectangular tube shape, a contact area of the winding portion 21 and an installation target is easily increased as compared to the case where the winding portion 21 has a cylindrical tube shape having the same inner area. The inner area is an opening area of a space surrounded by the inner periphery of the winding portion 21. Since the contact area is increased, heat is easily dissipated to the installation target via the winding portion 21. Moreover, the winding portion 21 is easily disposed on the installation target. Corner parts of the winding portion 21 are rounded.

An end part 21a and an end part 21b of the winding portion 21 are respectively pulled out to an outer peripheral side of the winding portion 21 on one and the other end sides in an axial direction of the winding portion 21. The insulation coating is stripped to expose the conductor in the first and second end parts 21a, 21b of the winding portion 21. Unillustrated terminal members are attached to the end parts 21a, 21b. An external device is connected to the coil 2 via these terminal members. The external device is not shown. A power supply for supplying power to the coil 2 can be cited as the external device.

(Magnetic Core)

As shown in FIG. 3, the magnetic core 3 includes a middle core part 30, a first end core part 31, a second end core part 32, a first side core part 33 and a second side core part 34. In FIG. 3, a boundary of each core part is shown by a two-dot chain line. This point applies also to FIGS. 9, 10 and 16 respectively referred to in the second to fourth embodiments to be described later. In this embodiment, an X direction, a Y direction and a Z direction are defined as follows. The X direction is a direction along an axial direction of the middle core part 30. The Y direction is a direction orthogonal to the X direction and is a parallel direction of the middle core part 30 and the first and second side core parts 33, 34. The Z direction is a direction orthogonal to both the X direction and Y direction. The X direction is equivalent to a length direction. The Y direction is equivalent to a width direction. The Z direction is equivalent to a height direction.

The magnetic core 3 has a θ shape when viewed from the Z direction as shown in FIG. 3. If the coil 2 is energized, a magnetic flux flows in the magnetic core 3 to form a θ-shaped closed magnetic path. In FIG. 3, thick broken-line arrows indicate flows of the magnetic flux. A flowing direction of the magnetic flux may be opposite to the one indicated by the above arrows shown in FIG. 3. The magnetic flux generated by the coil 2 flows from the middle core part 30 through the first end core part 31, the first and second side core parts 33, 34 and the second end core part 32 and returns to the middle core part 30. That is, two annular closed magnetic paths respectively passing through the first and second side core parts 33, 34 are formed in the magnetic core 3.

<Middle Core Part>

The middle core part 30 is a part of the magnetic core 3 to be arranged inside the coil 2. In this embodiment, both end parts in the X direction of the middle core part 30 project from both end surfaces 2a, 2b of the coil 2. These projecting parts are also parts of the middle core part 30.

The shape of the middle core part 30 is not particularly limited as long as corresponding to the inner shape of the winding portion 21. As shown in FIG. 2, the middle core part 30 of this embodiment has a substantially rectangular parallelepiped shape. When viewed from the X direction, corner parts of the middle core part 30 may be rounded to extend along the inner peripheral surfaces of the corner parts of the winding portion 21. That is, corner parts of the outer peripheral surface of the middle core part 30 may be rounded.

The middle core part 30 may be divided or may not be divided in the X direction. The middle core part 30 of this embodiment is divided into two in the X direction and includes a first middle core part 30a and a second middle core part 30b. The first middle core part 30a is located on one side in the X direction of the middle core part 30, specifically, on the side of the first end core part 31. The second middle core part 30b is located on the other side in the X direction of the middle core part 30, specifically, on the side of the second end core part 32. In this embodiment, the first and second middle core parts 30a, 30b are in contact and there is substantially no clearance between the first and second middle core parts 30a, 30b. That is, the middle core part 30 includes no gap part between the first and second middle core parts 30a, 30b. A length of each of the first and second middle core parts 30a, 30b may be appropriately set to obtain desired magnetic properties. The length mentioned here means a length in the X direction. The first middle core part 30a may be longer or shorter than the second middle core part 30b. In this embodiment, the first middle core part 30a is longer than the second middle core part 30b. Widths of the respective first and second middle core parts 30a, 30b are equal. The width mentioned here means a width in the Y direction.

The middle core part 30 may include a gap part. The gap part may be provided between the first and second middle core parts 30a, 30b. The gap part is preferably positioned inside the winding portion 21. By locating the gap part inside the winding portion 21, a leakage magnetic flux from a gap part is easily suppressed. Thus, a loss due to the leakage magnetic flux is easily reduced. A length of the gap part may be appropriately set to obtain desired magnetic properties. The length of the gap part is, for example, 0.1 mm or more, further 0.3 mm or more. An upper limit of the length of the gap part is, for example, 2 mm or less, further 1.5 mm or less or 1.0 mm or less. The gap part may be an air gap or a non-magnetic body such as a resin or ceramic may be arranged as such.

<First End Core Part, Second End Core Part>

The first end core part 31 is a part of the magnetic core 3 facing the end surface 2a of the coil 2. The second end core part 32 is a part facing the end surface 2b of the coil 2. Here, facing means that the respective end core parts 31, 32 and the respective end surfaces 2a, 2b of the coil are facing each other. The first and second end core parts 31, 32 are arranged at an interval in the X direction to sandwich the both end surfaces 2a, 2b of the coil 2.

The shapes of the respective first and second end core parts 31, 32 are not particularly limited as long as predetermined magnetic paths are formed. As shown in FIG. 2, the both end core parts 31, 32 of this embodiment have a substantially rectangular parallelepiped shape. Width of the respective first and second end core parts 31, 32 may be equal or different. In this embodiment, a width $W_{31}$ of the first end core part 31 and a width $W_{32}$ of the second end core part 32 are equal.

<First Side Core Part, Second Side Core Part>

The first and second side core parts 33, 34 are parts of the magnetic core 3 to be arranged outside the coil 2 to sandwich the middle core part 30. That is, the first and second side core parts 33, 34 are arranged at an interval in the Y direction to sandwich both side surfaces along the axial direction of the coil 2. In this embodiment, out of the both side core parts 33, 34, the side core part arranged on one side in the Y direction, i.e. on an upper side, is referred to as the first side core part 33 and the side core part arranged on the other side in the Y direction, i.e. on a lower side, is referred to as the second side core part 34 when viewed from the Z direction as shown in FIG. 3. Axial directions of the respective first and second side core parts 33, 34 are parallel to the axial direction of the middle core part 30.

The first and second side core parts 33, 34 may have lengths to link the first and second end core parts 31, 32. The shapes of the respective side core parts 33, 34 are not particularly limited. As shown in FIG. 2, the both side core parts 33, 34 of this embodiment have a substantially rectangular parallelepiped shape. Lengths of the respective first and second side core parts 33, 34 may be equal or different. In this embodiment, the lengths of the respective first and second side core parts 33, 34 are equal to each other, and equal to the length of the middle core part 30. The length of the middle core part 30 is the sum of the lengths of the respective middle core parts 30a, 30b. If the middle core part 30 includes the gap part, the length of the middle core part 30 is the sum of the lengths of the respective middle core parts 30a, 30b excluding the gap part. The length of each of the middle core part 30 and the first and second side core parts 33, 34 is equal to a distance between mutually facing surfaces of the first and second end core parts 31, 32.

Widths of the respective first and second side core parts 33, 34 may be equal or different. In this embodiment, the respective widths of the first and second side core parts 33, 34 are equal. Further, the sum of the width of the first side core part 33 and that of the second side core part 34 is equal to the width of the middle core part 30. That is, the sum of a cross-sectional area of the first side core part 33 and that of the second side core part 34 is equal to a cross-sectional area of the middle core part 30.

At least one of the first and second side core parts 33, 34 may be divided or may not be divided in the X direction. Neither of the both side core parts 33, 34 of this embodiment is divided.

If the middle core part 30 includes the aforementioned gap part, the middle core part 30 is shorter than the both side core parts 33, 34. If the sum length of the first and second middle core parts 30a, 30b is shorter than the lengths of the respective side core parts 33, 34, a clearance serving as the gap part can be provided between the first and second middle core parts 30a, 30b.

(First Core, Second Core)

As shown in FIGS. 2 and 3, the magnetic core 3 is a set obtained by combining the first and second cores 3a, 3b. The magnetic core 3 is configured by combining the first and second cores 3a, 3b in the X direction. The respective shapes of the first and second cores 3a, 3b can be selected from various combinations. The magnetic core 3 of this embodiment is of an E-T type obtained by combining the E-shaped first core 3a and the T-shaped second core 3b.

<First Core>

The first core 3a may include the first end core part 31, at least a part of the middle core part 30 and at least parts of the both side core parts 33, 34 including the first side core part 33 and the second side core part 34. In this embodiment, as shown in FIG. 3, the first core 3a includes the entire first side core part 33 and the entire second side core part 34. Further, the first core 3a includes the first middle core part 30a, which is the part of the middle core part 30. The first end core part 31, the first middle core part 30a, the first side core part 33 and the second side core part 34 are integrally molded. The first middle core part 30a extends in the X direction from an intermediate part in the Y direction of the first end core part 31 toward the second middle core part 30b. The first and second side core parts 33, 34 extend in the X direction toward the second end core part 32 from both end parts in the Y direction of the first end core part 31. The first core 3a is E-shaped when viewed from the Z direction.

Each of the first and second side core parts 33, 34 of the first core 3a has the tip surface 3af facing the second core 3b as shown in FIG. 3. As shown in FIG. 2, the tip surface 3af has a rectangular shape when viewed from the X direction. The tip surface 3af has a first chamfered portion 41 to be described later.

<Second Core>

The second core 3b may include the second end core part 32, a remaining part of the middle core part 30 and remaining parts of the first and second side core parts 33, 34. In this embodiment, as shown in FIG. 3, the second core 3b does not include the both side core parts 33, 34. The second core 3b includes the second middle core part 30b, which is the remaining part of the middle core part 30. The second end core part 32 and the second middle core part 30b are integrally molded. The second middle core part 30b extends in the X direction from an intermediate part in the Y direction of the second end core part 32 toward the first middle core part 30a. The second core 3b is T-shaped when viewed from the Z direction.

A surface of the second core 3b has the facing surfaces 3bf facing the tip surfaces 3af of the first core 3a in the X direction. That is, the facing surfaces 3bf are regions overlapping the tip surfaces 3af in the X direction, out of the surface of the second core 3b. In this embodiment, the facing surfaces 3bf are provided on the second end core part 32 of the second core 3b. The facing surface 3bf has a contact region to be brought into contact with the tip surface 3af and a non-contact region facing a surface formed by the first chamfered portion 41 on the tip surface 3af without contacting.

(Positional Relationship of Tip Surface and Facing Surface)

Figure 4:
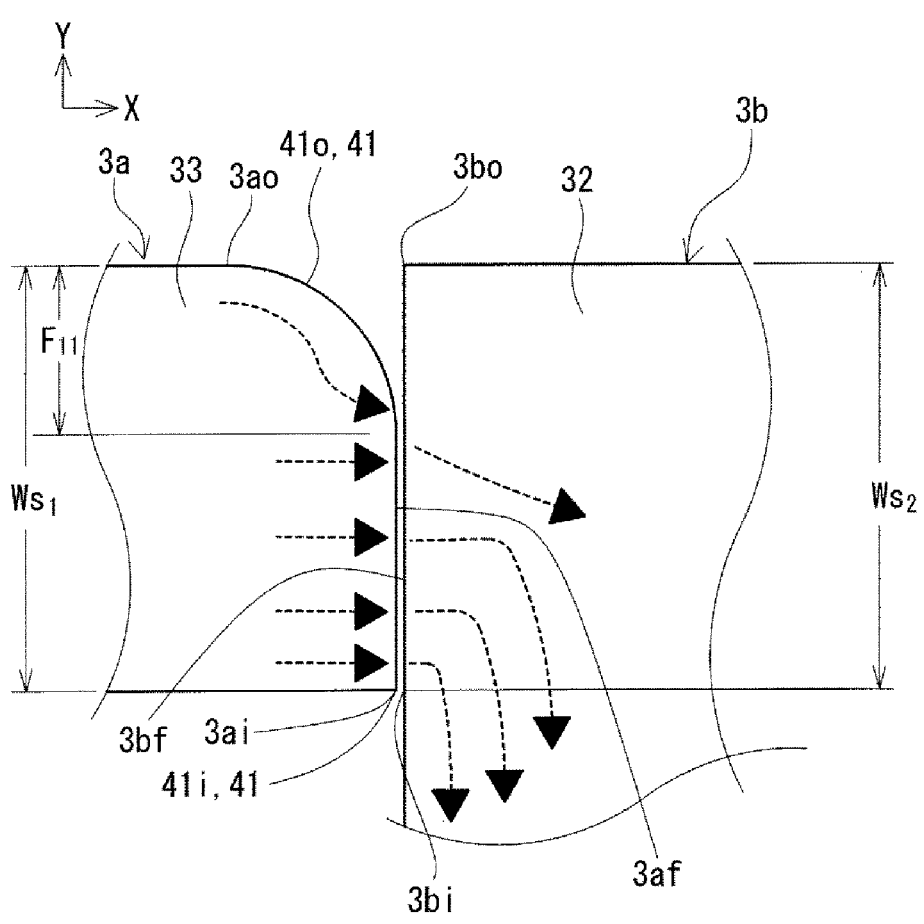
FIG. 4 is an enlarged view showing an outline of the vicinity of a contact part of a tip surface of a first core and a facing surface of a second core in a magnetic core provided in the reactor according to the first embodiment.

The tip surface 3af and the facing surface 3bf satisfy a specific positional relationship. In this embodiment, as shown in FIG. 4, an outer side edge 3bo of the facing surface 3bf is aligned with an outer side edge 3ao of the tip surface 3af in the Y direction, and an inner side edge 3bi of the facing surface 3bf and an inner side edge 3ai of the tip surface 3af are substantially aligned in the Y direction. In other words, the outer side edge 3bo of the facing surface 3bf and the outer side edge 3ao of the tip surface 3af, and the inner side edge 3bi of the facing surface 3bf and the inner side edge 3ai of the tip surface 3af are respectively not substantially shifted in the Y direction. FIG. 4 is an enlarged view showing the vicinity of the tip surface 3af and the facing surface 3bf on the side of the first side core part 33 when viewed from the Z direction. Although only the side of the first side core part 33 is shown in FIG. 4, the side of the second side core part 34 shown in FIG. 3 is also similarly configured. Further, although the tip surface $3af$ and the facing surface $3bf$ are shown to be separated for the convenience of description in FIG. 4, these surfaces are actually in contact with each other. This point applies also to FIGS. 6 to 8 referred to in modifications 1-1 to 1-3 to be described later. The outer side edge mentioned here means an edge on an outer side in the Y direction. The inner side edge means an edge on an inner side in the Y direction. The outer side in the Y direction means a side away from the middle core part 30 in the Y direction. The inner side in the Y direction means a side near the middle core part 30 in the Y direction. The outer side edge $3ao$ of the tip surface $3af$ or the outer side edge $3bo$ of the facing surface $3bf$ is an edge distant from the middle core part 30 (FIG. 3) when viewed from the Z direction, out of edges constituting the tip surface $3af$ or facing surface $3bf$. The inner side edge $3ai$ of the tip surface $3af$ or the inner side edge $3bi$ of the facing surface $3bf$ is an edge near the middle core part 30 (FIG. 3) when viewed from the Z direction, out of edges constituting the tip surface $3af$ or facing surface $3bf$. That "the outer side edge $3bo$ of the facing surface $3bf$ is aligned with the outer side edge $3ao$ of the tip surface $3af$ in the Y direction" means that the outer side edges $3bo$, $3ao$ are not shifted in the Y direction and the positions of the outer side edges $3bo$, $3ao$ in the Y direction coincide when viewed from the Z direction. That "the inner side edge $3bi$ of the facing surface $3bf$ and the inner side edge $3ai$ of the tip surface $3af$ are substantially aligned" means that a deviation in the Y direction between the inner side edges $3bi$ and $3ai$ is 10% or less, further 5% or less of a width $Ws_1$ of the tip surface $3af$. If the second end core part 32 has the facing surface $3bf$ as in this embodiment, the inner side edge $3bi$ of the facing surface $3bf$ is located on an extension of the inner side edge $3ai$ of the tip surface $3af$ in the X direction as shown in FIG. 4. Thus, the inner side edges $3bi$, $3ai$ are not shifted in the Y direction and are aligned in the Y direction. That is, when viewed from the Z direction, the positions of the inner side edges $3bi$ and $3ai$ in the Y direction coincide.

Unlike this embodiment, the outer side edge $3bo$ of the facing surface $3bf$ may be located inwardly in the Y direction of the outer side edge $3ao$ of the tip surface $3f$. "Located inwardly in the Y direction" described above means that the outer side edges $3bo$, $3ao$ are not aligned in the Y direction and the outer side edge $3bo$ is shifted inwardly of the outer side edge $3ao$ in the Y direction when viewed from the Z direction. A configuration in which the outer side edge $3bo$ is located inwardly in the Y direction of the outer side edge $3ao$ is described with reference to FIG. 7 in the modification 1-2 to be described later.

(First Chamfered Portion)

The tip surface $3af$ has the first chamfered portion 41. The first chamfered portion 41 is formed on the edge along the Z direction, out of the edges constituting the tip surface $3af$. The first chamfered portion 41 includes at least the first outer chamfered portion 41$o$, out of the first outer chamfered portion 41$o$ and the first inner chamfered portion 41$i$. The first outer chamfered portion 41$o$ is connected to the outer side edge $3ao$ of the tip surface $3af$. The first inner chamfered portion 41$i$ is connected to the inner side edge $3ai$ of the tip surface $3af$. It is sufficient for the first chamfered portion 41 to include the outer chamfered portion 41$o$, and the first inner chamfered portion 41$i$ may not be included. In this embodiment, a chamfer width of the first inner chamfered portion 41$i$ is substantially zero. Although the inner side edge $3ai$ (FIG. 4) of the tip surface $3af$ is shown as the first inner chamfered portion 41$i$ for the convenience of description in FIGS. 3 and 4, the first inner chamfered portion 41$i$ is not actually present. That is, in this embodiment, the tip surface $3af$ has only the first outer chamfered portion 41$o$. A configuration having both the first outer chamfered portion 41$o$ and the first inner chamfered portion 41$i$ is described with reference to FIG. 6 in the modification 1-1 to be described later.

Each of the first outer chamfered portion 41$o$ and the first inner chamfered portion 41$i$ may be roundly chamfered or linearly chamfered. Round chamfering means that the chamfered portion has an arcuate shape when viewed from the Z direction. Linear chamfering means that the chamfered portion has a linear shape when viewed from the Z direction. The first outer chamfered portion 41$o$ of this embodiment is roundly chamfered.

The tip surface $3af$ has a surface formed by the first chamfered portion 41. That is, surfaces formed by the respective first outer chamfered portion 41$o$ and first inner chamfered portion 41$i$ are also parts of the tip surface $3a$. The tip surface $3a$ includes a contact region to be brought into contact with the facing surface $3bf$ of the second core $3b$ and a non-contact region facing the facing surface $3bf$ without contacting. In this embodiment, the tip surface $3a$ includes a flat surface along the Y direction and an arcuate surface formed by the first outer chamfered portion 41$o$. Out of the tip surface $3af$, the flat surface is a surface including the contact region to be brought into contact with the facing surface $3bf$ of the second core $3b$. The surface formed by the first outer chamfered portion 41$o$ is the non-contact region not to be brought into contact with the facing surface $3bf$. The surface formed by the first outer chamfered portion 41$o$ is continuous from the flat surface to the outer side edge $3ao$. In other words, the first outer chamfered portions 41$o$ connect the flat surfaces of the tip surfaces $3af$ and the outer side surfaces of the first and second side core parts 33, 34 as shown in FIGS. 3 and 4. The outer side edge $3ao$ is a boundary edge between the tip surface $3af$ and the outer side surface of each side core part 33, 34. The outer side surface of each side core part 33, 34 is an outer surface in the Y direction of each side core part 33, 34, i.e. a surface located on a side opposite to the middle core part 30. The flat surface of the tip surface $3af$ may include the non-contact region depending on a width $Ws_2$ of the facing surface $3bf$ to be described later. Further, the flat surface may include the non-contact region depending on a chamfer width of a later-described second chamfered portion 42 (FIGS. 8 and 15) of the facing surface $3bf$, i.e. a magnitude of each of chamfer widths $F_{21}$, $F_{22}$ of a second outer chamfered portion 42$o$ and a second inner chamfered portion 42$i$.

The chamfer width of the first outer chamfered portion 41$o$ is larger than that of the first inner chamfered portion 41$i$. The chamfer width mentioned here means a width of the chamfered portion in the Y direction. As shown in FIG. 4, a chamfer width $F_{11}$ of the first outer chamfered portion 41$o$ is a distance along the Y direction between one end of the first outer chamfered portion 41$o$ connected to the outer side edge $3ao$ of the tip surface $3af$ and the other end thereof on an opposite side. If the first inner chamfered portion 41$i$ is not present, i.e. the chamfer width of the first inner chamfered portion 41$i$ is substantially zero as in this embodiment, the chamfer width of the first outer chamfered portion 41$o$ is assumed to satisfy a condition of being larger than that of the first inner chamfered portion 41$i$.

Since the chamfer width of the first outer chamfered portion 41$o$ is larger than that of the first inner chamfered portion 41$i$, a loss can be reduced. A reason why the loss can be reduced is described with reference to FIG. 4. In FIG. 4, thick broken-line arrows indicate flows of a magnetic flux.

When a magnetic flux flows in the magnetic core 3 (FIG. 3), the magnetic flux becomes denser on an inner side in the Y direction of each side core part 33, 34 and becomes sparser toward an outer side in the Y direction. This is because a magnetic flux generally flows to shorten a magnetic path. The magnetic flux flowing in the first and second cores 3a, 3b tries to flow in the both cores 3a, 3b. When the magnetic flux passes between the tip surface 3af of the first core 3a and the facing surface 3bf of the second core 3b, a part of the magnetic flux detours between the first and second cores 3a, 3b if the first chamfered portion 41 is formed on the tip surface 3af. As shown in FIG. 4, the magnetic flux flowing on the outer side of the first side core part 33 detours due to the first outer chamfered portion 41o as shown in FIG. 4. However, since little magnetic flux flows on the outer side in the first place, the magnetic flux detouring due to the first outer chamfered portion 41o is little. Thus, even if the chamfer width of the first outer chamfered portion 41o is large, it slightly or hardly affects the magnetic flux flowing in the first and second cores 3a, 3b. Further, if the chamfer width of the first inner chamfered portion 41i is zero as in this embodiment, the magnetic flux flowing on the inner side of the first side core part 33 does not detour due to the first inner chamfered portion 41i. That is, the magnetic flux flowing on the inner side smoothly flows between the first and second cores 3a, 3b without detouring. Therefore, the loss can be reduced since the flow of the magnetic flux is hardly hindered between the first and second cores 3a, 3b.

Figure 5:
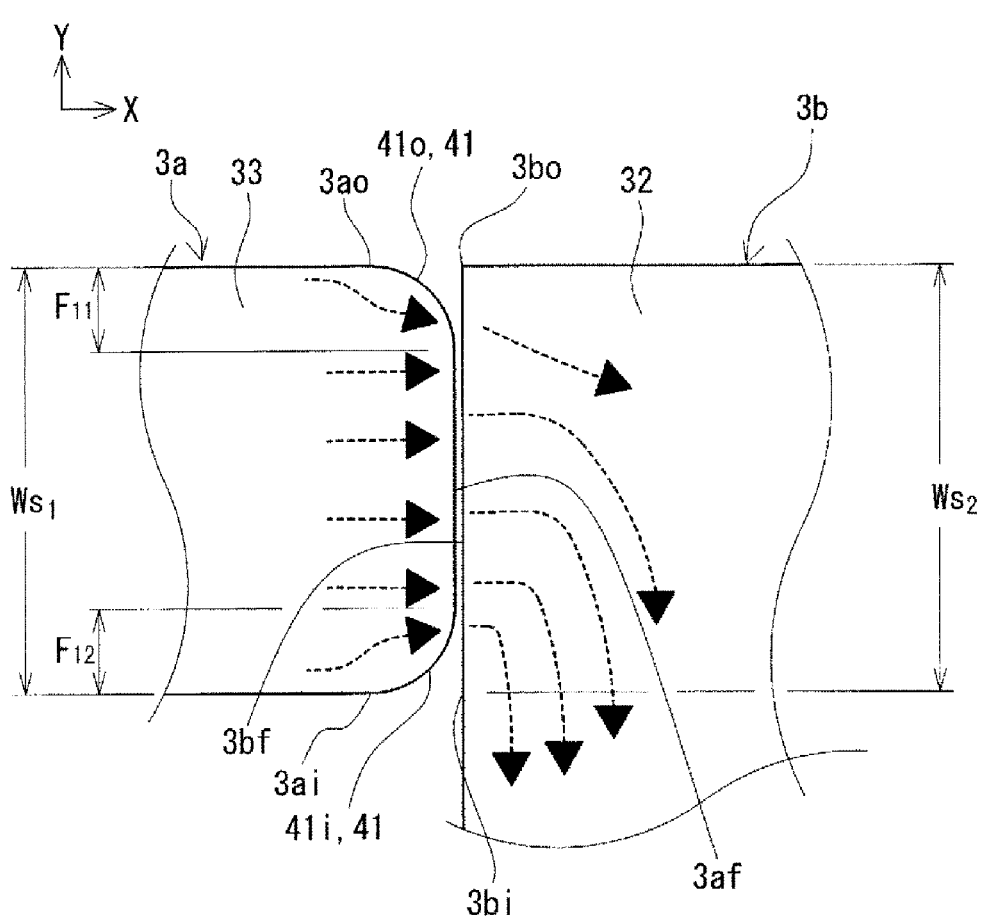
FIG. 5 is an enlarged view showing an outline of the vicinity of a contact part of a tip surface of a first core and a facing surface of a second core in a comparison core.

Contrary to this, if the tip surface 3af has both the first outer chamfered portion 41o and the first inner chamfered portion 41i and the chamfer widths of the respective first outer chamfered portion 41o and the first inner chamfered portion 41i are equal as in a comparison core shown in FIG. 5, a loss is easily caused. This is because the magnetic flux flowing on the inner side of the first side core part 33 largely detours due to the first inner chamfered portion 41i. Thus, the loss is caused since the flow of the magnetic flux is hindered between the first and second cores 3a, 3b.

The chamfer width $F_{11}$ of the first outer chamfered portion 41o is, for example, 10% or more and 45% or less, further 20% or more and 40% or less of the width $Ws_1$ of the tip surface 3af. The larger the chamfer width $F_{11}$ of the first outer chamfered portion 41o, the smaller the volume of the first core 3a. Thus, the weight of the first core 3a can be reduced. That is, a weight reduction of the magnetic core 3 can be expected. The magnetic core 3 is easily reduced in weight if the chamfer width $F_{11}$ of the first outer chamfered portion 41o is 10% or more. Further, a contact area of the tip surface 3af and the facing surface 3bf is easily secured if the chamfer width $F_{11}$ of the first outer chamfered portion 41o is 45% or less. By securing the contact area of the tip surface 3af and the facing surface 3bf, the magnetic flux easily flows between the first and second cores 3a, 3b. Thus, the loss is easily reduced. A specific numerical value of the chamfer width $F_{11}$ of the first outer chamfered portion 41o is, for example, 2.4 mm or more and 6 mm or less, further 3 mm or more and 5 mm or less although it depends on the width $Ws_1$ of the tip surface 3af.

In this embodiment, the chamfer width of the first inner chamfered portion 41i is substantially zero. "Substantially zero" mentioned above means that the chamfer width is less than 1 mm. The chamfer width of the first inner chamfered portion 41i is described in detail with reference to FIG. 6 in the modification 1-1 to be described later.

(Width Relationship of Facing Surface and Tip Surface)

In this embodiment, the width $Ws_2$ of the facing surface 3bf and the width $Ws_1$ of the tip surface 3af are equal. The width $Ws_2$ of the facing surface 3bf may be shorter than the width $Ws_1$ of the tip surface 3af. A configuration in which the width $Ws_2$ of the facing surface 3bf is shorter than the width $Ws_1$ of the tip surface 3af is described with reference to FIG. 7 in the modification 1-2 to be described later.

(Relative Magnetic Permeability Relationship of First and Second Cores)

The first and second cores 3a, 3b may have the same relative magnetic permeability or may have different relative magnetic permeabilities. In this embodiment, the relative magnetic permeability of the second core 3b is higher than that of the first core 3a. Since the relative magnetic permeability of the second core 3b is higher than that of the first core 3a, magnetic properties of the entire magnetic core 3 can be adjusted. Thus, even if the magnetic core 3 is not provided with a gap part as in this embodiment, a predetermined inductance is easily obtained. A gap part may be provided if necessary even if the relative magnetic permeabilities of the first and second cores 3a, 3b satisfy the above relationship.

The relative magnetic permeability of each of the first and second cores 3a, 3b can be appropriately set. The relative magnetic permeability of the first core 3a is, for example, 5 or more and 50 or less. The relative magnetic permeability of the second core 3b is, for example, 50 or more and 500 or less. If the relative magnetic permeability of each of the first and second cores 3a, 3b is within the above range, a predetermined inductance is easily obtained. The relative magnetic permeability of the first core 3a may be further 10 or more and 45 or less, or 15 or more and 40 or less. The relative magnetic permeability of the second core 3b may be further 100 or more, or 150 or more.

The relative magnetic permeability can be obtained as follows. Ring-shaped measurement samples are cut out respectively from the first and second cores 3a, 3b. Primary winding: 300 turns and secondary winding: 20 turns are applied to each of the measurement samples. A B-H initial magnetization curve is measured in a range of H=0 (Oe) or more and 100 (Oe) or less, and a maximum value of B/H of this B-H initial magnetization curve is obtained. This maximum value is set as a relative magnetic permeability. The magnetization curve mentioned here is a so-called direct-current magnetization curve.

(Materials)

The first and second cores 3a, 3b are constituted by compacts. Powder compacts, compacts of composite materials and the like can be, for example, cited as the compacts. The first and second cores 3a, 3b may be compacts made of the same material or may be compacts made of mutually different materials. The mutually different materials mean not only a case where materials of individual constituent elements of the respective compacts constituting the first and second cores 3a, 3b are different, but also a case where contents of the respective constituent elements are different even if the materials of the respective constituent elements are the same. For example, even if the first and second cores 3a, 3b are constituted by powder compacts, these cores 3a, 3b are made of mutually different materials if the materials and contents of soft magnetic powders constituting the powder compacts are different. Further, even if the first and second cores 3a, 3b are constituted by compacts of composite materials, these cores 3a, 3b are made of mutually different materials if the materials and contents of soft magnetic powders constituting the composite materials are different.

The powder compact is obtained by compression-forming a raw powder containing a soft magnetic powder. The powder compact has a higher content of the soft magnetic powder as compared to composite materials. Thus, the powder compact easily enhances magnetic properties. A relative magnetic permeability and a saturated magnetic flux density can be cited as the magnetic properties. The powder compact may contain a binder resin, a molding aid and the like. A content of the magnetic powder in the powder compact is, for example, 85% by volume or more and 99.99% by volume or less if the powder compact is 100% by volume.

In the composite material, the soft magnetic powder is dispersed in the resin. The compact of the composite material is obtained by filling a fluid raw material, in which the soft magnetic powder is dispersed in the uncured resin, into a mold and solidifying the resin. The composite material can easily adjust a content of the soft magnetic powder in the resin. Thus, the composite material easily adjusts magnetic properties. A content of the soft magnetic powder in the composite material is, for example, 20% by volume or more and 80% by volume or less if the composite material is 100% by volume.

Particles of soft magnetic metals, coated particles including insulation coatings on the outer peripheries of particles of soft magnetic metals, particles of soft magnetic nonmetals and the like can be cited as particles constituting the soft magnetic powder. Pure iron and iron-based alloys can be cited as the soft magnetic metal. Fe (iron)-Si (silicon) alloys, Fe—Ni (nickel) alloys and the like can be cited as the iron-based alloys. Phosphates and the like can be cited as materials of the insulation coatings. Ferrite and the like can be cited as the soft magnetic nonmetals.

Thermosetting resins and thermoplastic resins can be, for example, cited as the resin of the composite material. An unsaturated polyester resin, an epoxy resin, a urethane resin, a silicone resin and the like can be, for example, cited as the thermosetting resins. A polyphenylene sulfide resin, a polytetrafluoroethylene resin, a liquid crystal polymer, a polyamide resin, a polybutylene terephthalate resin, an acrylonitrile-butadiene-styrene resin and the like can be cited as the thermoplastic resins. Nylon 6, nylon 66, nylon 9T and the like can be cited as the polyimide resin. Besides, a BMC (Bulk Molding Compound) in which calcium carbonate and a glass fiber are mixed in an unsaturated polyester, millable type silicone rubber, millable type urethane rubber and the like can also be used.

The composite material may contain a filler in addition to the soft magnetic powder and the resin. Ceramic fillers such as alumina and silica can be, for example, cited as the filler. By containing the filler in the composite material, heat dissipation can be enhanced. A content of the filler is 0.2% by mass or more and 20% by mass or less, further 0.3% by mass or more and 15% by mass or less, or 0.5% by mass or more and 10% by mass or less when the composite material is 100% by volume.

The content of the soft magnetic powder in the powder compact or the compact of the composite material is regarded as equivalent to an area ratio of the soft magnetic powder in a cross-section of the compact. The content of the soft magnetic powder is obtained as follows. An observation image is obtained by observing the cross-section of the compact by a SEM (Scanning Electron Microscope). A magnification of the SEM is, for example, 200× or more and 500× or less. 10 or more observation images are obtained. A total cross-sectional area is 0.1 cm$^2$ or more. One observation image may be obtained for one cross-section or a plurality of observation images may be obtained for one cross-section. An image processing is applied to each obtained observation image and the contours of the particles are extracted. A binarization processing can be, for example, cited as the image processing. An area ratio of the soft magnetic particles is calculated in each observation image and an average value of the area ratios is obtained. That average value is regarded as the content of the soft magnetic powder.

In this embodiment, the first and second cores 3a, 3b are compacts made of mutually different materials. Specifically, the first core 3a is a compact of a composite material, and the second core 3b is a powder compact. By constituting the first core 3a by the compact of the composite material and constituting the second core 3b by the powder compact, magnetic properties of the entire magnetic core 3 can be adjusted. Thus, a predetermined inductance is easily obtained even if the magnetic core 3 is not provided with the gap part as in this embodiment. Further, if the first core 3a is constituted by the compact of the composite material and the second core 3b is constituted by the powder compact, the relative magnetic permeability of the second core 3b is easily set higher than that of the first core 3a. In this embodiment, the relative magnetic permeability of the first core 3a is 20 and that of the second core 3b is 150.

(Size)

For example, if the reactor 1 is for vehicle, the size of the magnetic core 3 is as follows as shown in FIG. 1. A length L in the X direction of the magnetic core 3 is, for example, 30 mm or more and 150 mm or less. A width W in the Y direction of the magnetic core 3 is, for example, 30 mm or more and 150 mm or less. A height H in the Z direction of the magnetic core 3 is, for example, 15 mm or more and 75 mm or less. In this embodiment, the width W of the magnetic core 3 is equivalent to the widths $W_{31}$, $W_{32}$ of the respective first and second end core parts 31, 32.

Further, the sizes of main parts of the magnetic core 3 are as follows. A width of the middle core part 30, i.e. widths of the first and second middle core parts 30a, 30b, is, for example, 10 mm or more and 50 mm or less. Lengths of the first and second end core parts 31, 32 are, for example, 5 mm or more and 40 mm or less. Widths of the first and second side core parts 33, 34 are, for example, 5 mm or more and 40 mm or less. The widths of the first and second side core parts 33, 34 are equivalent to the width $Ws_1$ of the tip surface 3af. The size of each core part is related to a magnitude of a magnetic path area of the magnetic core 3.

(Miscellaneous)

The reactor 1 may include at least one of a case, an adhesive layer, a holding member and a molded resin portion as another component. The case is a member for accommodating an assembly of the coil 2 and the magnetic core 3 inside. The assembly accommodated in the case may be embedded by a sealing resin portion. The adhesive layer fixes the assembly to a placing surface, fixes the assembly to the inner bottom surface of the case and fixes the case to the placing surface or the like. The holding member is interposed between the coil 2 and the magnetic core 3 to ensure electrical insulation between the coil 2 and the magnetic core 3. The molded resin portion integrates the coil 2 and the magnetic core 3 by covering the outer periphery of the assembly.

[Functions and Effects]

The reactor 1 of the first embodiment can reduce a loss. This is because the chamfer width $F_{11}$ of the first outer chamfered portion 41o is larger than the chamfer width of the first inner chamfered portion 41i. If the chamfer width $F_{11}$ of the first outer chamfered portion 41o is larger than the chamfer width of the first inner chamfered portion 41i, a flow of a magnetic flux is less likely to be hindered than the configuration shown in FIG. 5 in which the chamfer widths of the chamfered portions 41o, 41i on both sides are equal. Thus, a loss caused by the hindered flow of the magnetic flux can be reduced.

Particularly, if the chamfer width $F_{11}$ of the first outer chamfered portion 41o is in a specific range and the chamfer width of the first inner chamfered portion 41i is in a specific range, the loss can be effectively reduced.

Since the first core 3a is constituted by the compact of the composite material and the second core 3b is constituted by the powder compact, each of the relative magnetic permeabilities of the first and second cores 3a, 3b is easily set in a predetermined range. Further, if the first core 3a is constituted by the compact of the composite material and the second core 3b is constituted by the powder compact, a predetermined inductance is easily obtained even if the magnetic core 3 is not provided with a gap part.

[Modification 1-1]

Figure 6:
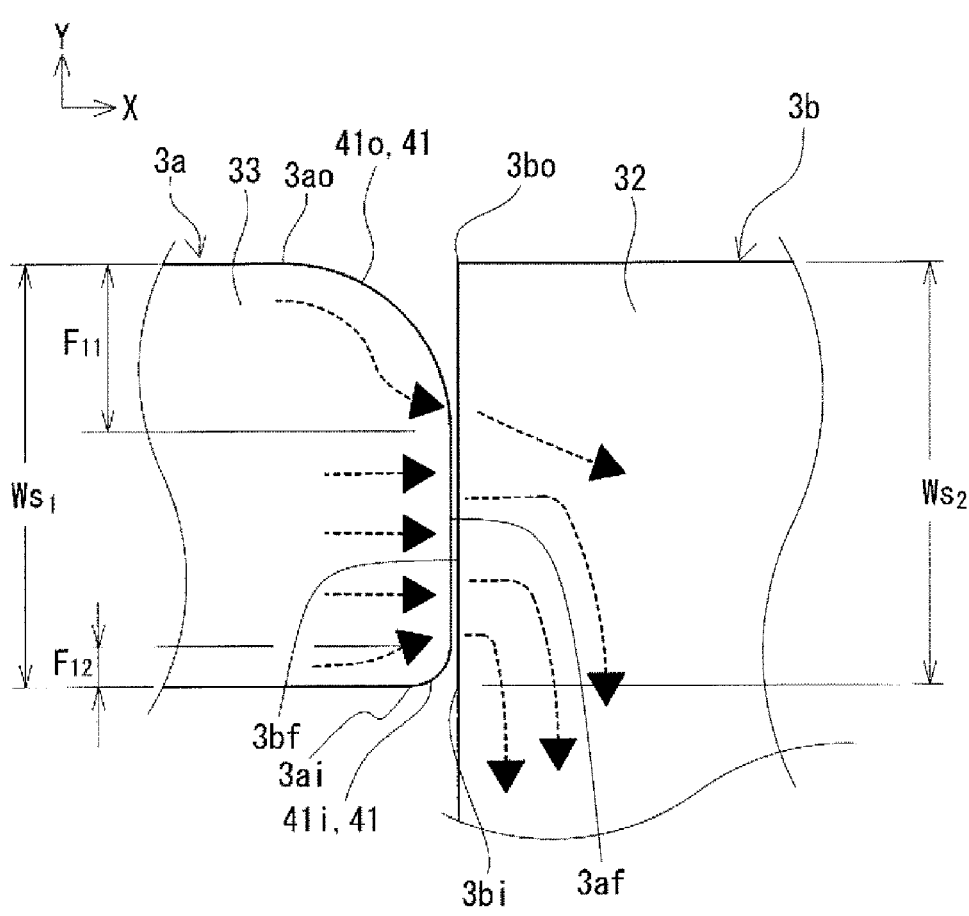
FIG. 6 is an enlarged view showing an outline of the vicinity of a contact part of a tip surface of a first core and a facing surface of a second core in a modification 1-1.

With reference to FIG. 6, a modification of the reactor 1 of the first embodiment is described. The modification 1-1 differs from the first embodiment in that the tip surface 3af has both the first outer chamfered portion 41o and the first inner chamfered portion 41i as the first chamfered portion 41. Although only the side of the first side core part 33 is shown in FIG. 6, the side of the second side core part 34 shown in FIG. 3 is also similarly configured. In FIG. 6, thick broken-line arrows indicate flows of a magnetic flux. The following description is centered on points of difference from the first embodiment. Components similar to those of the first embodiment may not be described.

In this example, both the first outer chamfered portion 41o and the first inner chamfered portion 41i are present. Each of the first outer chamfered portion 41o and the first inner chamfered portion 41i of this example is roundly chamfered. Unlike this example, each of the first outer chamfered portion 41o and the first inner chamfered portion 41i may be linearly chamfered. The first outer chamfered portion 41o and the first inner chamfered portion 41i may have the same shape or may have different shapes. For example, one of the first outer chamfered portion 41o and the first inner chamfered portion 41i may be roundly chamfered and the other may be linearly chamfered.

The tip surface 3af has surfaces formed by the respective first outer chamfered portion 41o and first inner chamfered portion 41i. In this example, the tip surface 3af has a flat surface along the Y direction, an arcuate surface formed by the first outer chamfered portion 41o and an arcuate surface formed by the first inner chamfered portion 41i. The surface formed by the first inner chamfered portion 41i is a non-contact region not to be brought into contact with the facing surface 3bf of the second core 3b. The surface formed by the first inner chamfered portion 41i is continuous from the flat surface to the inner side edge 3ai. In other words, the first inner chamfered portion 41i connects the flat surface along the Y direction of the tip surface 3af and the inner side surface of the first side core part 33. The inner side edge 3ai is a boundary edge between the tip surface 3af and the inner side surface of the first side core part 33. The inner side surface of the first side core part 33 is a surface located on the inner side in the Y direction of the first side core part 33, i.e. a surface located on the side of the middle core part 30 shown in FIG. 3.

The chamfer width $F_{11}$ of the first outer chamfered portion 41o is larger than the chamfer width $F_{12}$ of the first inner chamfered portion 41i. In other words, the chamfer width $F_{12}$ is smaller than the chamfer width $F_{11}$. The chamfer width $F_{12}$ of the first inner chamfered portion 41i is a distance along the Y direction between one end of the first inner chamfered portion 41i connected to the inner side edge 3ai of the tip surface 3af and the other end thereof on an opposite side.

As shown in FIG. 6, when a magnetic flux passes between the tip surface 3af of the first core 3a and the facing surface 3bf of the second core 3b, the magnetic flux flowing on the inner side of the first side core part 33 detours due to the first inner chamfered portion 41i. However, since the chamfer width $F_{12}$ of the first inner chamfered portion 41i is smaller than the chamfer width $F_{11}$ of the first outer chamfered portion 41o, less magnetic flux detours due to the first inner chamfered portion 41i as compared to the configuration shown in FIG. 5 in which the respective chamfer widths $F_{11}$, $F_{12}$ of the first outer chamfered portion 41o and the first inner chamfered portion 41i are equal. Thus, the magnetic flux flowing on the inner side relatively smoothly flows between the first and second cores 3a, 3b. Therefore, a loss can be reduced since the flow of the magnetic flux is hardly hindered between the first and second cores 3a, 3b.

The chamfer width $F_{12}$ of the first inner chamfered portion 41i is, for example, 12.5% or less, further 10% or less or 5% or less of the width $Ws_1$ of the tip surface 3af. If the chamfer width $F_{12}$ of the first inner chamfered portion 41i is 12.5% or less of the width $Ws_1$ of the tip surface 3af, the detour of the magnetic flux due to the first inner chamfered portion 41i is easily suppressed. Thus, the occurrence of the loss due to the hindered flow of the magnetic flux between the first and second cores 3a, 3b is easily suppressed. Further, if the chamfer width $F_{12}$ of the first inner chamfered portion 41i is 12.5% or less of the width $Ws_1$ of the tip surface 3af, a contact area of the tip surface 3af and the facing surface 3bf is easily secured. By securing the contact area of the tip surface 3af and the facing surface 3bf, the magnetic flux easily flows between the first and second cores 3a, 3b. Therefore, the loss is easily reduced. The chamfer width $F_{12}$ of the first inner chamfered portion 41i is, specifically, 2 mm or less, further 1.5 mm or less or 1 mm or less. The chamfer width $F_{12}$ of the first inner chamfered portion 41i may be zero.

[Modification 1-2]

Figure 7:
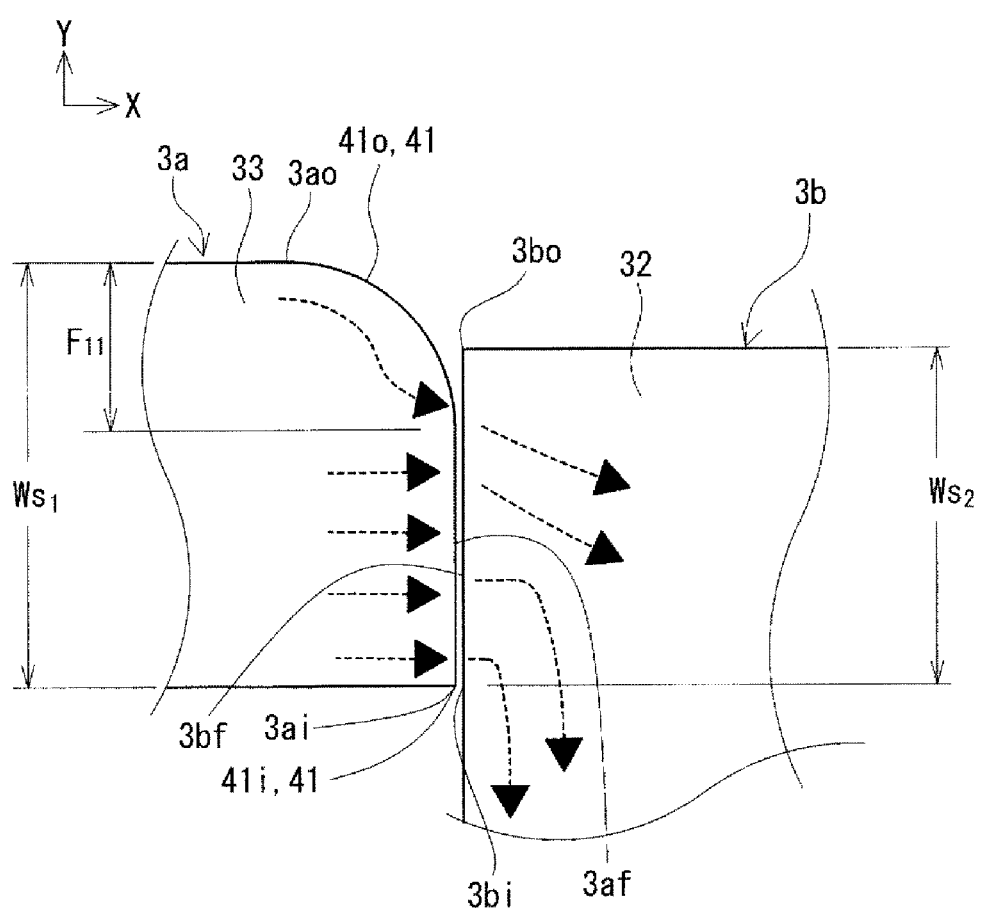
FIG. 7 is an enlarged view showing an outline of the vicinity of a contact part of a tip surface of a first core and a facing surface of a second core in a modification 1-2.

With reference to FIG. 7, a modification of the reactor 1 of the first embodiment is described. The modification 1-2 differs from the first embodiment in that the width $Ws_2$ of the facing surface 3bf is shorter than the width $Ws_1$ of the tip surface 3af. Although only the side of the first side core part 33 is shown in FIG. 7, the side of the second side core part 34 shown in FIG. 3 is also similarly configured. In FIG. 7, thick broken-line arrows indicate flows of a magnetic flux. The following description is centered on points of difference from the first embodiment. Components similar to those of the first embodiment may not be described.

(Positional Relationship of Tip Surface and Facing Surface)

In this example, a positional relationship of the tip surface 3af and the facing surface 3bf is set as follows. As shown in FIG. 7, the outer side edge 3bo of the facing surface 3bf is located inwardly in the Y direction of the outer side edge 3ao of the tip surface 3af.

(Width Relationship of Facing Surface and Tip Surface)

In this example, the width $Ws_2$ of the facing surface 3bf is shorter than the width $Ws_1$ of the tip surface 3af. Since the width $Ws_2$ of the facing surface 3bf is shorter than the width $Ws_1$ of the tip surface 3af, the volume of the second core 3b is reduced as compared to the case where the width $Ws_2$ of the facing surface 3bf and the width $Ws_1$ of the tip surface 3af are equal. Thus, the weight of the magnetic core (FIG.

3) can be reduced since the weight of the second core $3b$ is reduced. When viewed from the Z direction as shown in FIG. 7, an outer part in the Y direction of the first side core part 33 projects further outward than the second end core part 32. Thus, in the magnetic core 3 (FIG. 3), the width $W_{32}$ of the second end core part 32 is shorter than the width $W_{31}$ of the first end core part 31. Specifically, the width $W_{32}$ of the second end core part 32 is shorter than the width $W_{31}$ of the first end core part 31 by differences between the tip surfaces $3af$ and the facing surfaces $3bf$. The width W of the magnetic core 3 is equivalent to the width $W_{31}$ of the first end core part 31.

The width $Ws_2$ of the facing surface $3bf$ is, for example, 60% or more and 92% or less, further 65% or more and 90% or less or 70% or more and 85% or less of the width $Ws_1$ of the tip surface $3af$. Since the width $Ws_2$ of the facing surface $3bf$ is 60% or more of the width $Ws_1$ of the tip surface $3af$, the contact area of the tip surface $3af$ and the facing surface $3bf$ is easily secured. By securing the contact area of the tip surface $3af$ and the facing surface $3bf$, a magnetic flux which can pass between the tip surface $3af$ and the facing surface $3bf$ is easily set in a substantially balanced range. If the magnetic flux is in the substantially balanced range, a balance of the magnetic flux can be substantially maintained between the first and second cores $3a$, $3b$ when a magnetic path is formed in the magnetic core (FIG. 3). Thus, electromagnetic performance such as an inductance can be maintained. Since the width $Ws_2$ of the facing surface $3bf$ is 92% or less of the width $Ws_1$ of the tip surface $3af$, the width $Ws_2$ of the facing surface $3bf$ is sufficiently short. Therefore, the weight of the second core $3b$ can be effectively reduced.

(Relative Magnetic Permeability Relationship of First and Second Cores)

If the width $Ws_2$ of the facing surface $3bf$ is shorter than the width $Ws_1$ of the tip surface $3af$ as in this example, the relative magnetic permeability of the second core $3b$ is preferably higher than that of the first core $3b$. That is, if $\mu r_1$ denotes the relative magnetic permeability of the first core $3a$ and $\mu r_2$ denotes the relative magnetic permeability of the second core $3b$, a relationship of $\mu r_1 < \mu r_2$ is satisfied. Since the relative magnetic permeability of the second core $3b$ is higher than that of the first core $3a$, the magnetic flux is easily balanced between the tip surface $3af$ and the facing surface $3bf$ even if the width $Ws_2$ of the facing surface $3bf$ is shorter than the width $Ws_1$ of the tip surface $3af$. Thus, a balance of the magnetic flux can be substantially maintained between the first and second cores $3a$, $3b$. Therefore, the width $Ws_2$ of the facing surface $3bf$ can be made shorter than the width $Ws_1$ of the tip surface $3af$ while the electromagnetic performance such as an inductance is maintained.

Further, a ratio of the relative magnetic permeability of the second core $3b$ to that of the first core $3a$ is preferably 1.1 or more and 12 or less. That is, a relationship of $1.1 \leq \mu r_2/\mu r_1 \leq 12$ is satisfied. If the relative magnetic permeability ratio is 1.1 or more, the relative magnetic permeability of the second core $3b$ is sufficiently higher than that of the first core $3a$. Thus, the width $Ws_2$ of the facing surface $3bf$ can be made sufficiently shorter than the width $Ws_1$ of the tip surface $3af$. If the relative magnetic permeability ratio is 12 or less, a predetermined inductance is easily obtained. The relative magnetic permeability ratio may be further 1.5 or more, 2 or more, or 2.5 or more.

(Relationship of Relative Magnetic Permeability and Tip Surface Width of first Core and Relative Magnetic Permeability and Facing Surface Width of Second Core)

If $\mu r_1$ denotes the relative magnetic permeability of the first core $3a$, $Ws_1$ denotes the width of the tip surface $3af$, $\mu r_2$ denotes the relative magnetic permeability of the second core $3b$ and $Ws_2$ denotes the width of the facing surface $3bf$, $\{(\mu r_1 \times Ws_1)/(\mu r_2 \times Ws_2)\}$ preferably satisfies a condition of being 0.1 or more and 1.6 or less. If the relative magnetic permeability $\mu r_1$ and the width $Ws_1$, and the relative magnetic permeability $\mu r_2$ and the width $Ws_2$ satisfy the above relational expression, a magnetic flux which can pass between the tip surface $3af$ and the facing surface $3bf$ can be set in a substantially balanced range. If $\{(\mu r_1 \times Ws_1)/(\mu r_2 \times Ws_2)\}$ is 0.1 or more and 1.6 or less, a balance of the magnetic flux can be substantially maintained between the first and second cores $3a$, $3b$ since the magnetic flux is in the substantially balanced range. Therefore, a reduction in inductance can be effectively suppressed. $\{(\mu r_1 \times Ws_1)/(\mu r_2 \times Ws_2)\}$ may be further 0.1 or more and 1.4 or less, or 0.15 or more or 1.2 or less.

Since the width $Ws_2$ of the facing surface $3bf$ is shorter than the width $Ws_1$ of the tip surface $3af$ in the modification 1-2, the magnetic core 3 can be reduced in weight. Therefore, a weight reduction of the reactor can be achieved.

[Modification 1-3]

Figure 8:
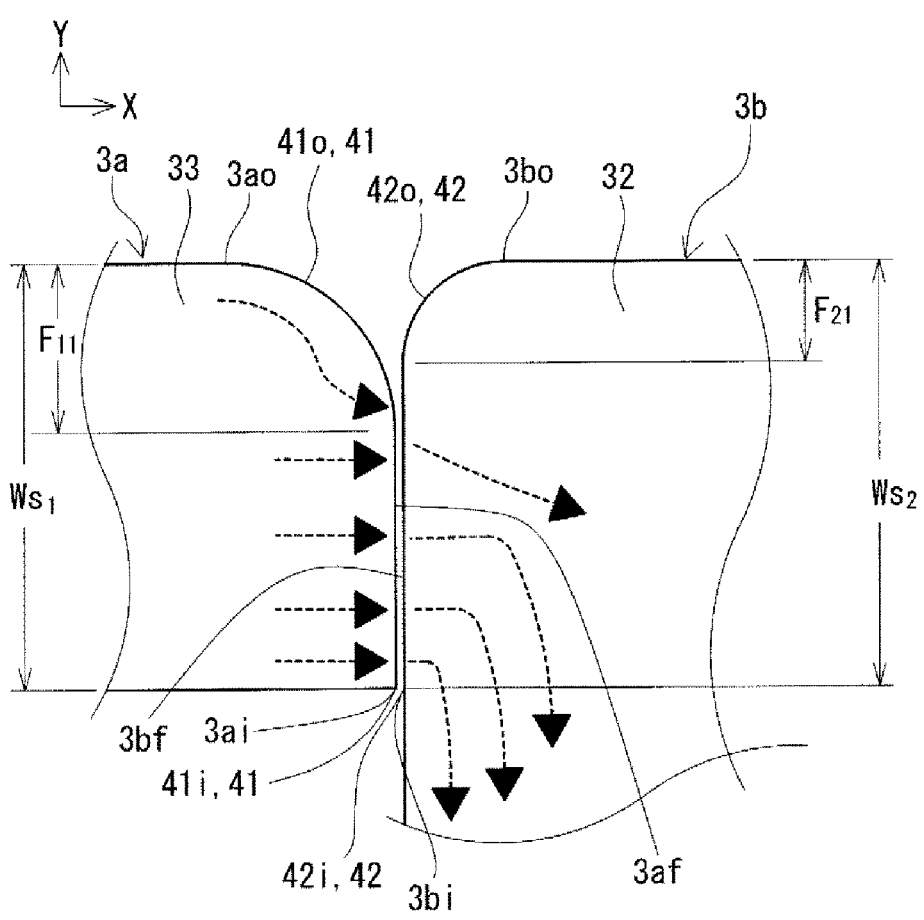
FIG. 8 is an enlarged view showing an outline of the vicinity of a contact part of a tip surface of a first core and a facing surface of a second core in a modification 1-3.

With reference to FIG. 8, a modification of the reactor 1 of the first embodiment is described. The modification 1-3 differs from the first embodiment in that the facing surface $3bf$ has a second chamfered portion 42. Although only the side of the first side core part 33 is shown in FIG. 8, the side of the second side core part 34 shown in FIG. 3 is also similarly configured. In FIG. 8, thick broken-line arrows indicate flows of a magnetic flux. The following description is centered on points of difference from the first embodiment. Components similar to those of the first embodiment may not be described.

(Second Chamfered Portion)

The second chamfered portion 42 is formed on an edge along the Z direction, out of edges constituting the facing surface $3bf$. The second chamfered portion 42 includes at least a second outer chamfered portion 42o, out of the second outer chamfered portion 42o and a second inner chamfered portion 42i. The second outer chamfered portion 42o is connected to the outer side edge $3bo$ of the facing surface $3bf$. The second inner chamfered portion 42i is connected to the inner side edge $3bi$ of the facing surface $3bf$. It is sufficient for the second chamfered portion 42 to include the second outer chamfered portion 42o, and the second inner chamfered portion 42i may not be included. Although the inner side edge $3bi$ of the facing surface $3bf$ is shown as the second inner chamfered portion 42i for the convenience of description in FIG. 8, the second inner chamfered portion 42i is not actually present. That is, in this example, the facing surface $3bf$ has only the second outer chamfered portion 42o.

The second outer chamfered portion 42o may be roundly chamfered or linearly chamfered. The second outer chamfered portion 42o of this embodiment is roundly chamfered.

The facing surface $3bf$ has a surface formed by the second chamfered portion 42. That is, surfaces formed by the respective second outer chamfered portion 42o and second inner chamfered portion 42i are also parts of the facing surface $3bf$. In this example, the facing surface $3bf$ has a flat surface along the Y direction and an arcuate surface formed by the second outer chamfered portion 42o. Out of the facing surface $3bf$, the flat surface is a surface including a contact region to be brought into contact with the tip surface $3af$. The surface formed by the second outer chamfered portion 42o is a non-contact region not to be brought into contact with the tip surface $3af$. The surface formed by the second outer chamfered portion 42o is continuous from the flat surface to the outer side edge 3bo. In other words, the second outer chamfered portion 42o connects the flat surface of the facing surface 3bf and the outer side surface of the second end core part 32. The outer side edge 3bo is a boundary edge between the facing surface 3bf and the outer side surface of the second end core part 32. The outer side surface of the second end core part 32 is an end surface on the outer side in the Y direction of the second end core part 32. The flat surface of the facing surface 3bf may include a non-contact region depending on the width $Ws_1$ of the tip surface 3af described above. Further, the flat surface may include a non-contact region depending on the chamfer widths of the first chamfered portion 41, specifically the respective chamfer widths $F_{11}$, $F_{12}$ of the first outer chamfered portion 41o and first inner chamfered portion 41i.

The chamfer width of the second outer chamfered portion 42o is larger than that of the second inner chamfered portion 42i. The chamfer width mentioned here means a width in the Y direction of the chamfered portion. As shown in FIG. 8, the chamfer width $F_{21}$ of the second outer chamfered portion 42o is a distance between one end of the second outer chamfered portion 42o connected to the outer side edge 3bo of the facing surface 3bf and the other end thereof on an opposite side. If the second inner chamfered portion 42i is not present, i.e. the chamfer width of the second inner chamfered portion 42i is zero, as in this example, the chamfer width of the second outer chamfered portion 42o is assumed to satisfy a condition of being larger than that of the first inner chamfered portion 41i.

The chamfer width $F_{21}$ of the second outer chamfered portion 42o is equal to or less than the chamfer width $F_{11}$ of the first outer chamfered portion 41o. If the chamfer width $F_{21}$ of the second outer chamfered portion 42o is equal to or less than the chamfer width $F_{11}$ of the first outer chamfered portion 41o, the detour of a magnetic flux due to the second outer chamfered portion 42o can be avoided. Therefore, the occurrence of a loss due to a hindered flow of the magnetic flux between the first and second cores 3a, 3b is easily suppressed. Further, if the chamfer width $F_{21}$ of the second outer chamfered portion 42o is equal to or less than the chamfer width $F_{11}$ of the first outer chamfered portion 41o, the contact area of the tip surface 3af and the facing surface 3bf is easily secured. By securing the contact area of the tip surface 3af and the facing surface 3bf, a magnetic flux easily flows between the first and second cores 3a, 3b. Thus, a loss is easily suppressed. The chamfer width $F_{21}$ of the second outer chamfered portion 42o may be appropriately set according to the chamfer width $F_{11}$ of the first outer chamfered portion 41o and is, for example, 2.4 mm or more and 6 mm or less, further 3 mm or more and 5 mm or less.

In the modification 1-3, a weight reduction of the magnetic core 3 (FIG. 3) can be expected by the facing surface 3bf having the second outer chamfered portion 42o. This is because the volume of the second core 3b is reduced by the second outer chamfered portion 42o. Therefore, the magnetic core 3 can be reduced in weight since the weight of the second core 3b is reduced.

Second Embodiment

Figure 9:
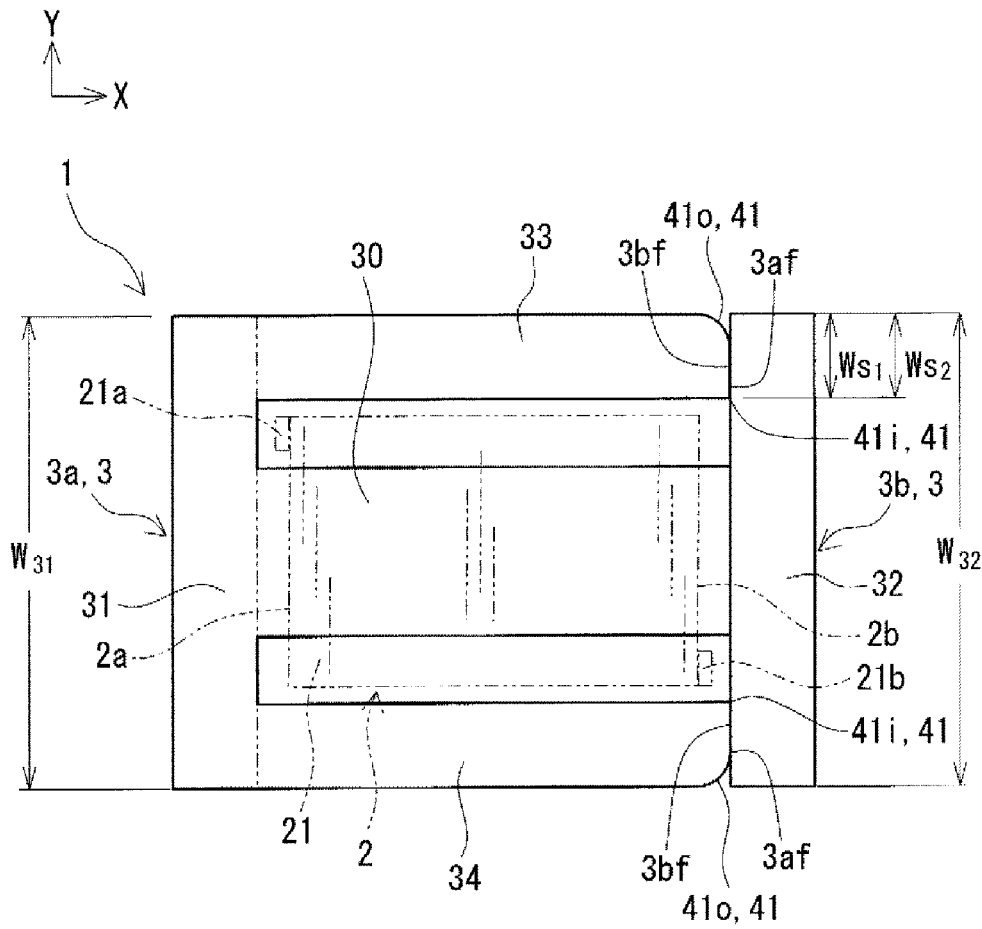
FIG. 9 is a top view showing an outline of an entire reactor according to a second embodiment.

A reactor 1 of the second embodiment is described with reference to FIG. 9. The reactor 1 of the second embodiment differs from the reactor 1 of the first embodiment in that a magnetic core 3 is of an E-I type. The following description is centered on points of difference from the first embodiment. Components similar to those of the first embodiment may not be described.

A first core 3a includes a first end core part 31, an entire middle core part 30 and entire first and second side core parts 33, 34. The middle core part 30 extends in the X direction toward a second end core part 32 from an intermediate part in the Y direction of the first end core part 31. The first core 3a is E-shaped. The first core 3a is a compact of a composite material.

The second core 3b includes only the second end core part 32. The second core 3b does not include the middle core part 30 and the first and second side core parts 33, 34. The second core 3b is I-shaped. The second core 3b is a powder compact.

In this embodiment, an end part of the middle core part 30 on the side of the second end core part 32 is in contact with the second end core part 32. Thus, there is substantially no clearance between the middle core part 30 and the second end core part 32 and a gap part is not present. Unlike this embodiment, a gap part can be provided between the middle core part 30 and the second end core part 32. In the case of providing the gap part between the middle core part 30 and the second end core part 32, the middle core part 30 is shorter than the both side core parts 33, 34. In this way, a clearance serving as the gap part can be provided between the middle core part 30 and the second end core part 32.

[Functions and Effects]

The reactor 1 of the second embodiment can reduce a loss similarly to the reactor 1 of the first embodiment. Further, the respective configurations of the modifications 1-1 to 1-3 described as the modifications of the first embodiment are applicable to the second embodiment.

Third Embodiment

A reactor 1 of the third embodiment is described with reference to FIGS. 10 and 11. The reactor 1 of the third embodiment differs from the reactor 1 of the first embodiment in that a magnetic core 3 is of an E-E type. The following description is centered on points of difference from the first embodiment. Components similar to those of the first embodiment may not be described. FIG. 11 is an enlarged view of the vicinity of a tip surface 3af and a facing surface 3bf on the side of a first side core part 33 when viewed from the Z direction. Although only the side of the first side core part 33 is shown in FIG. 11, the side of a second side core part 34 shown in FIG. 10 also has a similar configuration. Further, although the tip surface 3af and the facing surface 3bf are shown to be separated for the convenience of description in FIG. 11, these surfaces are actually in contact. This point also applies in FIGS. 13 to 15 respectively referred to in modifications 3-1 to 3-3 to be described later.

Figure 10:
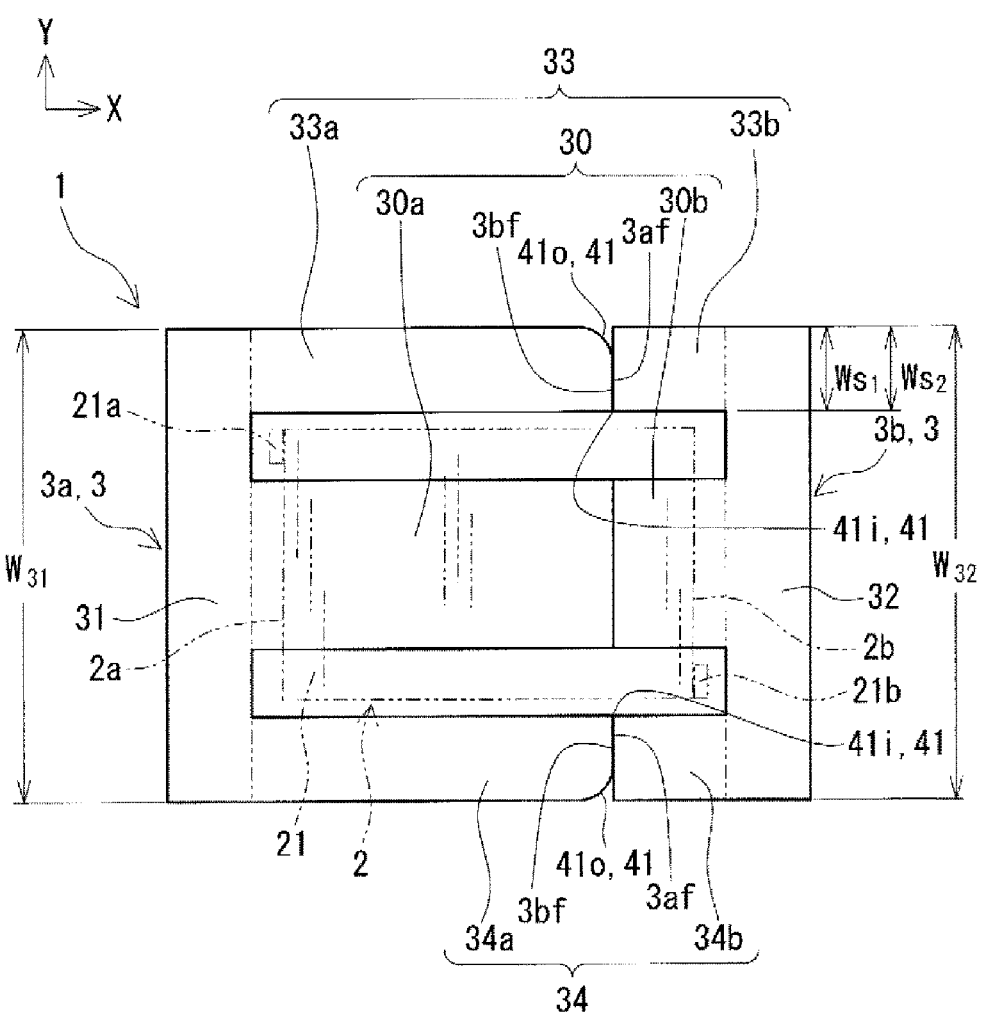
FIG. 10 is a top view showing an outline of an entire reactor according to a third embodiment.
Figure 11:
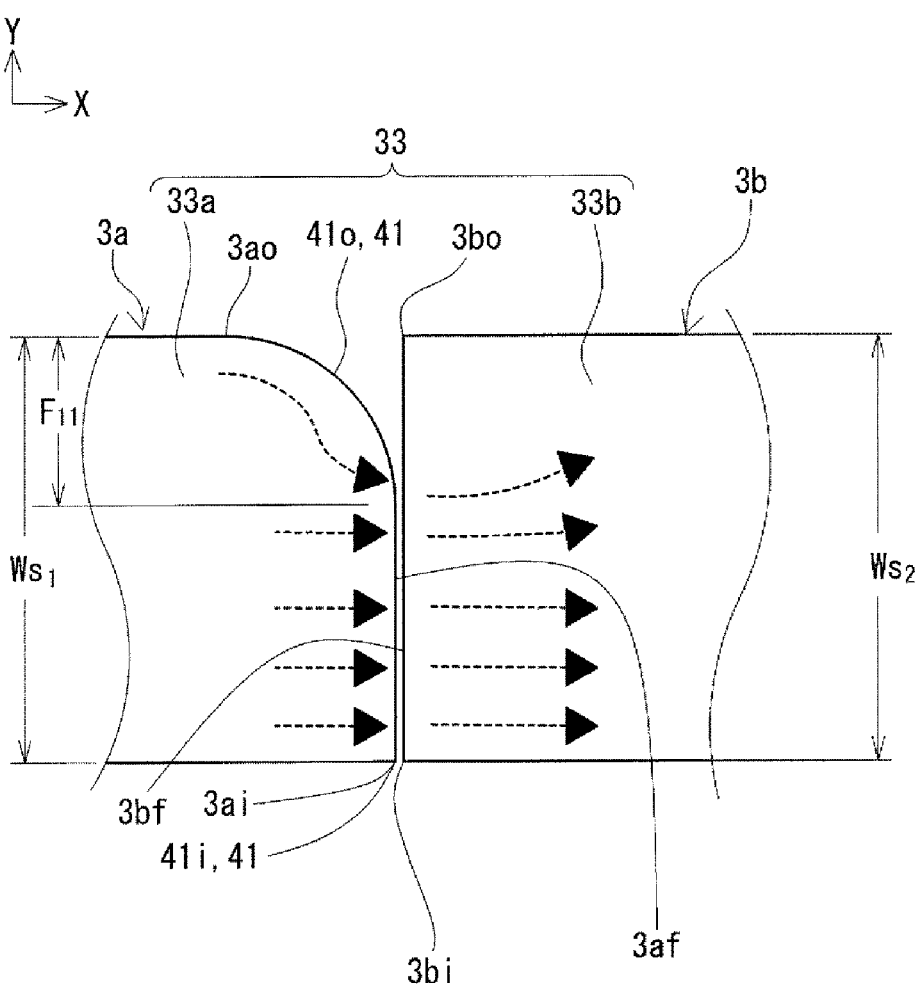
FIG. 11 is an enlarged view showing an outline of the vicinity of a contact part of a tip surface of a first core and a facing surface of a second core in a magnetic core provided in the reactor according to the third embodiment.

Each of the first and second side core parts 33, 34 of this embodiment is divided into two in the X direction as shown in FIG. 10. The first side core part 33 includes a first part 33a and a second part 33b. The second side core part 34 includes a first part 34a and a second part 34b. The first part 33a, 34a is located on one side in the X direction of each side core part 33, 34, specifically, on the side of a first end core part 31. The second part 33b, 34b is located on the other side in the X direction of each side core part 33, 34, specifically, on the side of a second end core part 32. Widths of the first parts 33a, 34a are equal. Widths of the second parts 33b, 34b are equal. Further, a total width of the first parts 33a, 34a is equal to a width of a middle core part 30.

The first parts 33a, 34a and the second parts 33b, 34b are in contact, and there is substantially no clearance between the first parts 33a, 34a and the second parts 33b, 34b. That is, the both side core parts 33, 34 include no gap part between the first parts 33*a*, 34*a* and the second parts 33*b*, 34*b*. A length of each of the first parts 33*a*, 34*a* and the second parts 33*b*, 34*b* may be appropriately set to obtain predetermined magnetic properties. The first parts 33*a*, 34*a* may be longer or shorter than the second parts 33*b*, 34*b*. Further, the respective lengths of the first parts 33*a*, 34*a* may be equal or different. The respective lengths of the second parts 33*b*, 34*b* may be equal or different. In this embodiment, the first parts 33*a*, 34*a* are longer than the second parts 33*b*, 34*b*. Further, the respective lengths of the first parts 33*a*, 34*a* are equal. The respective lengths of the second parts 33*b*, 34*b* are equal.

As shown in FIG. 10, a first core 3*a* includes the first end core part 31, a first middle core part 30*a* and the first parts 33*a*, 34*a*, which are parts of the first and second side core parts 33, 34. The first end core part 31, the first middle core part 30*a* and the first parts 33*a*, 34*a* of the both side core parts 33, 34 are integrally molded. The first parts 33*a*, 34*a* extend in the X direction toward the second parts 33*b*, 34*b* from both end parts in the Y direction of the first end core part 31. The first core 3*a* is E-shaped when viewed from the Z direction. The first core 3*a* is a compact of a composite material.

Each of the first parts 33*a*, 34*a* in the both side core parts 33, 34 of the first core 3*a* has the tip surface 3*af* facing the second core 3*b* as shown in FIG. 10. A width $Ws_1$ of the tip surface 3*af* is equal to the widths of the first parts 33*a*, 34*a*.

A second core 3*b* includes the second end core part 32, a second middle core part 30*b* and the second parts 33*b*, 34*b*, which are remaining parts of the first and second side core parts 33, 34. The second end core part 32, the second middle core part 30*b* and the second parts 33*b*, 34*b* of the both side core parts 33, 34 are integrally molded. The second parts 33*b*, 34*b* extend in the X direction toward the first parts 33*a*, 34*a* from both end parts in the Y direction of the second end core part 32. The second core 3*b* is E-shaped when viewed from the Z direction. The second core 3*b* is a powder compact.

In this embodiment, the facing surface 3*bf* is provided on the second part 33*b*, 34*b* of each of the first and second side core parts 33, 34. A width $Ws_2$ of the facing surface 3*bf* of this embodiment is equal to the widths of the second parts 33*b*, 34*b*.

The tip surface 3*af* and the facing surface 3*bf* satisfy a specific positional relationship as in the first embodiment. Specifically, as shown in FIG. 11, an outer side edge 3*bo* of the facing surface 3*bf* is aligned with an outer side edge 3*ao* of the tip surface 3*af* in the Y direction, and an inner side edge 3*bi* of the facing surface 3*bf* and an inner side edge 3*ai* of the tip surface 3*af* are substantially aligned in the Y direction. In this embodiment, the outer side edge 3*ao* or inner side edge 3*ai* of the tip surface 3*af* is a boundary edge between the tip surface 3*af* and the outer or inner side surface of the first part 33*a*, 34*a*. The outer side edge 3*bo* or inner side edge 3*bi* of the facing surface 3*bf* is a boundary edge between the facing surface 3*bf* and the outer or inner side surface of the second part 33*b*, 34*b*.

Further, as in the first embodiment, the tip surface 3*af* has a first chamfered portion 41. In this embodiment, the tip surface 3*af* has only the first outer chamfered portion 41*o* as the first chamfered portion 41. A chamfer width of a first inner chamfered portion 41*i* is substantially zero. Although the inner side edge 3*ai* (FIG. 11) of the tip surface 3*af* is shown as the first inner chamfered portion 41*i* for the convenience of description in FIGS. 10 and 11, the first inner chamfered portion 41*i* is not actually present. The first outer chamfered portion 41*o* of this embodiment is roundly chamfered. As shown in FIGS. 10 and 11, the first outer chamfered portion 41*c* connects a flat surface along the Y direction of the tip surface 3*af* and the outer side surface of the first part 33*a*, 34*a*.

Also in this embodiment, a loss can be reduced as in the first embodiment since a chamfer width of the first outer chamfered portion 41*o* is larger than that of the first inner chamfered portion 41*i*. Why the loss can be reduced is described with reference to FIG. 11. In FIG. 11, thick broken-line arrows indicate flows of a magnetic flux. When a magnetic flux flows between the tip surface 3*af* of the first core 3*a* and the facing surface 3*bf* of the second core 3*b*, a part of the magnetic flux detours between the first and second cores 3*a*, 3*b* if the first chamfered portion 41 is formed on the tip surface 3*af*. As shown in FIG. 11, the magnetic flux flowing on an outer side of the first side core part 33 detours due to the first outer chamfered portion 41*o*. As described above, little magnetic flux flows on the outer side in the first place. Thus, even if the chamfer width of the first outer chamfered portion 41*o* is large, it slightly or hardly affects the magnetic flux flowing in the first and second cores 3*a*, 3*b*. Further, if the chamfer width of the first inner chamfered portion 41*i* is zero, the magnetic flux flowing on an inner side of the first side core part 33 does not detour due to the first inner chamfered portion 41*i*. That is, the magnetic flux flowing on the inner side smoothly flows between the first and second cores 3*a*, 3*b*. Thus, the loss can be reduced since the flow of the magnetic flux is hardly hindered between the first and second cores 3*a*, 3*b*.

Figure 12:
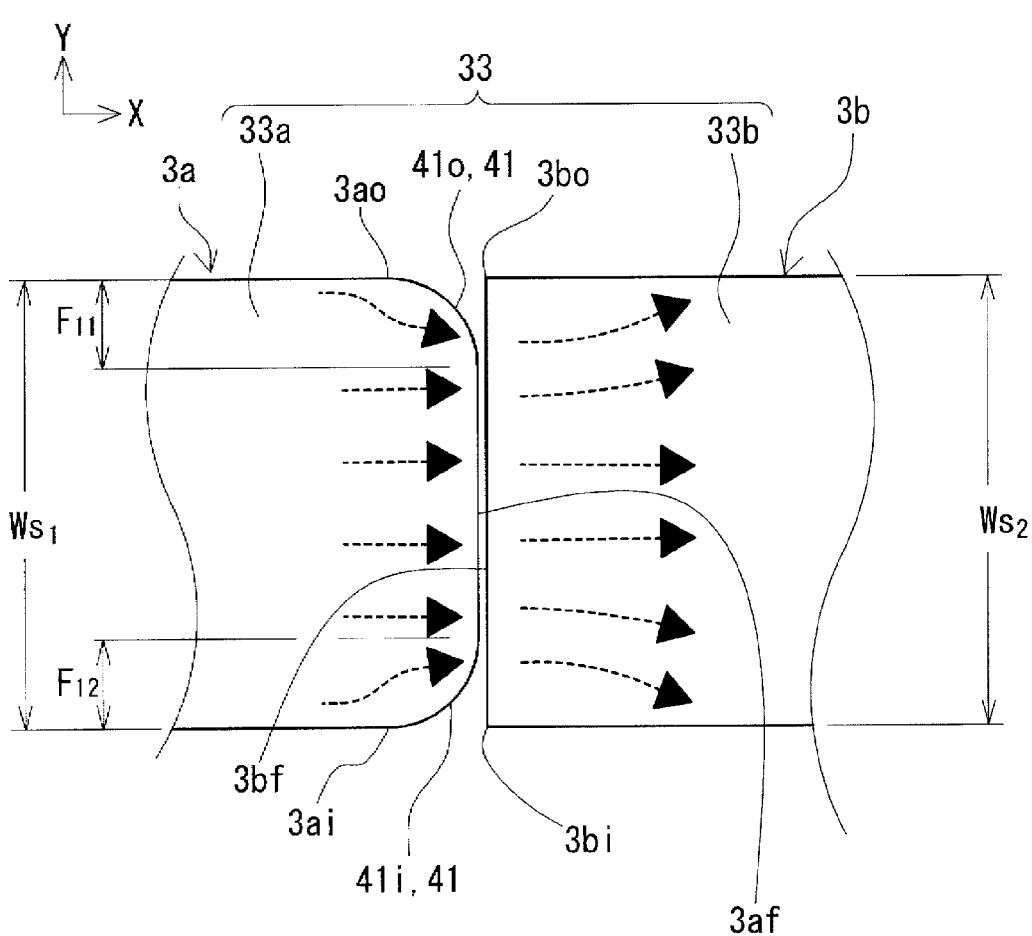
FIG. 12 is an enlarged view showing an outline of the vicinity of a contact part of a tip surface of a first core and a facing surface of a second core in a comparison core.

Contrary to this, if the tip surface 3*af* has both the first outer chamfered portion 41*o* and the first inner chamfered portion 41*i* and the chamfer widths of the respective first outer chamfered portion 41*o* and first inner chamfered portion 41*i* are equal as in a comparison core shown in FIG. 12, a loss is easily caused. This is because a magnetic flux flowing on the inner side of the first side core part 33 detours due to the first inner chamfered portion 41*i*. Thus, the loss is caused since the flow of the magnetic flux is hindered between the first and second cores 3*a*, 3*b*.

[Functions and Effects]

The reactor 1 of the third embodiment can reduce a loss, similarly to the reactor 1 of the first embodiment.

[Modification 3-1]

Figure 13:
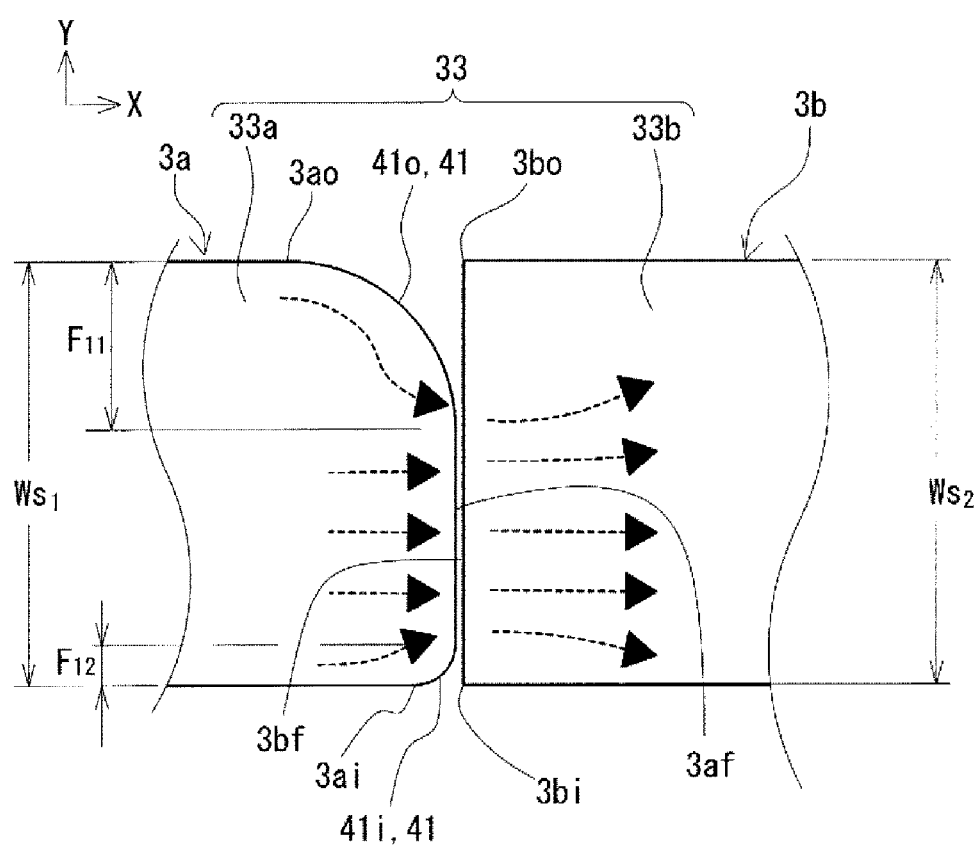
FIG. 13 is an enlarged view showing an outline of the vicinity of a contact part of a tip surface of a first core and a facing surface of a second core in a modification 3-1.

With reference to FIG. 13, a modification of the reactor 1 of the third embodiment is described. The modification 3-1 differs from the third embodiment in that the tip surface 3*af* has both the first outer chamfered portion 41*o* and the first inner chamfered portion 41*i* as the first chamfered portion 41. Although only the side of the first side core part 33 is shown in FIG. 13, the side of the second side core part 34 shown in FIG. 10 is also similarly configured. In FIG. 13, thick broken-line arrows indicate flows of a magnetic flux. The configuration of each of the first outer chamfered portion 41*o* and the first inner chamfered portion 41*i* is as in the modification 1-1 shown in FIG. 6 described in the first embodiment. The first inner chamfered portion 41*i* connects the flat surface along the Y direction of the tip surface 3*af* and the inner side surface of the first part 33*a*.

[Modification 3-2]

Figure 14:
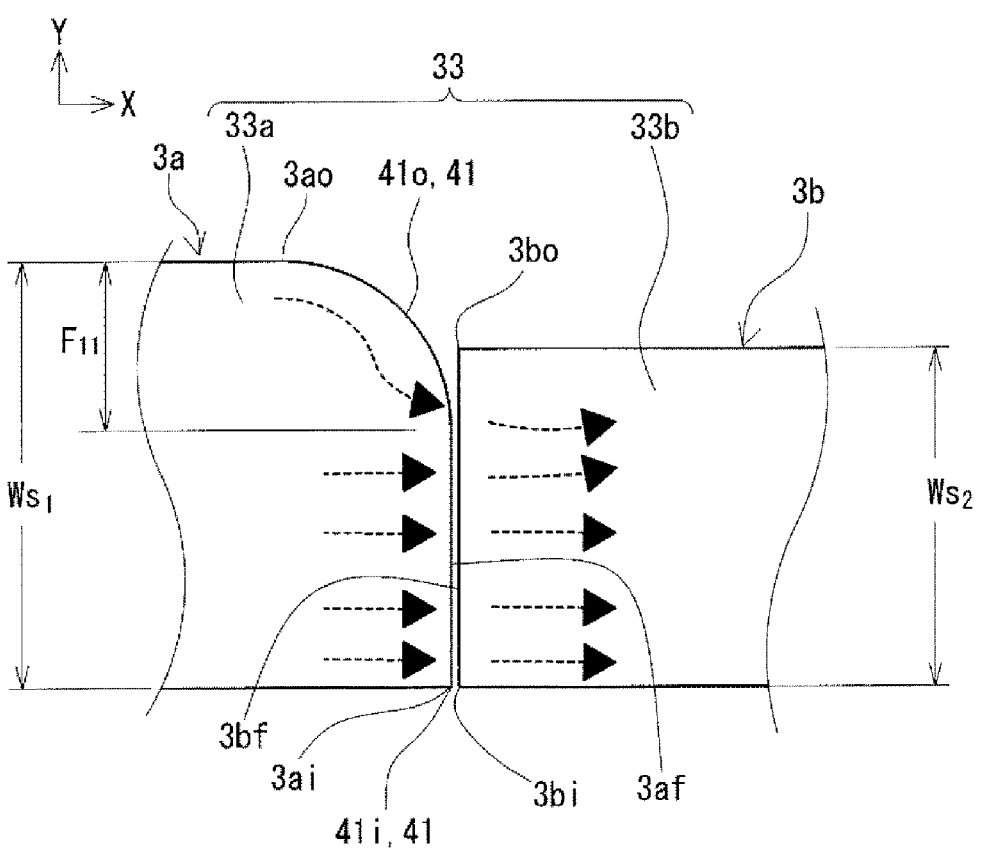
FIG. 14 is an enlarged view showing an outline of the vicinity of a contact part of a tip surface of a first core and a facing surface of a second core in a modification 3-2.

With reference to FIG. 14, a modification of the reactor 1 of the third embodiment is described. The modification 3-2 differs from the third embodiment in that the outer side edge 3*bo* of the facing surface 3*bf* is located inwardly in the Y direction of the outer side edge 3*ao* of the tip surface 3*af* and the width $Ws_2$ of the facing surface 3*bf* is shorter than the width $Ws_1$ of the tip surface 3*af*. Although only the side of the first side core part 33 is shown in FIG. 14, the side of the second side core part 34 shown in FIG. 10 is also similarly configured. In FIG. 14, thick broken-line arrows indicate flows of a magnetic flux. A positional relationship of the facing surface 3*bf* and the tip surface 3*af*, a relationship of the width $Ws_2$ of the facing surface 3*bf* and the width $Ws_1$ of the tip surface 3*af* and a relationship of a relative magnetic permeability $\mu r_1$ of the first core 3*a* and a relative magnetic permeability $\mu r_2$ of the second core 3*b* are as in the modification 1-2 shown in FIG. 7 described in the first embodiment. Further, as in the modification 1-2, the relative magnetic permeability $\mu r_1$ and the width $Ws_1$, and the relative magnetic permeability $\mu r_2$ and the width $Ws_2$ satisfy the above relational expression. That is, $\{(\mu r_1 \times Ws_1)/(\mu r_2 \times Ws_2)\}$ is 0.1 or more and 1.6 or less.

In this example, as shown in FIG. 14, the width of the first part 33*a* is equivalent to the width $Ws_1$ of the tip surface 3*af*, and the width of the second part 33*b* is equivalent to the width $Ws_2$ of the facing surface 3*bf*. Thus, the width of the second part 33*b* is shorter than that of the first part 33*a*. Further, as shown in FIG. 14, an outer part in the Y direction of the first part 33*a* projects further outward than the second part 33*b*. Thus, the width $W_{32}$ of the second end core part 32 is shorter than the width $W_{31}$ of the first end core part 31 in the magnetic core (FIG. 10).

In the modification 3-2, since the width $Ws_2$ of the facing surface 3*bf* is shorter than the width $Ws_1$ of the tip surface 3*af*, the volume of the second core 3*b* is reduced as compared to the case where the width $Ws_1$ of the tip surface 3*af* and the width $Ws_2$ of the facing surface 3*bf* are equal. Thus, the magnetic core 3 can be reduced in weight since the weight of the second core 3*b* is reduced. Hence, a weight reduction of the reactor can be achieved.

[Modification 3-3]

Figure 15:
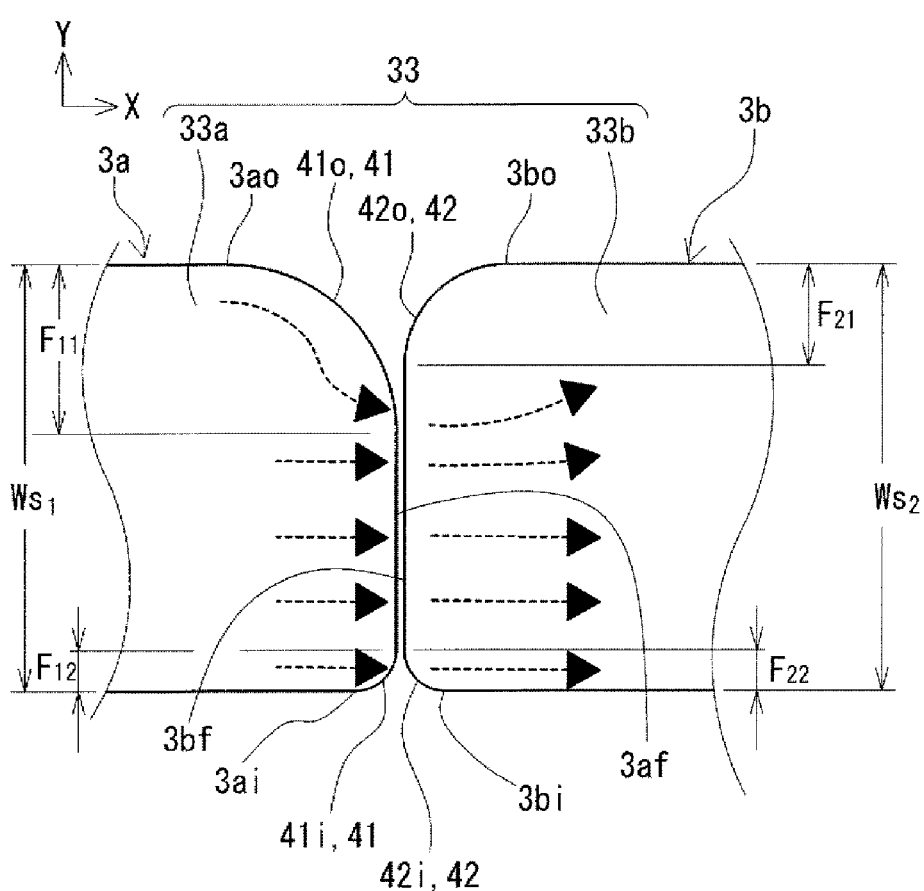
FIG. 15 is an enlarged view showing an outline of the vicinity of a contact part of a tip surface of a first core and a facing surface of a second core in a modification 3-3.

With reference to FIG. 15, a modification of the reactor 1 of the third embodiment is described. The modification 3-3 differs from the third embodiment, more specifically from the modification 3-1, in that the facing surface 3*bf* has a second chamfered portion 42. Although only the side of the first side core part 33 is shown in FIG. 15, the side of the second side core part 34 shown in FIG. 10 is also similarly configured. In FIG. 15, thick broken-line arrows indicate flows of a magnetic flux. The configuration of each of the first outer chamfered portion 410 and the first inner chamfered portion 41*i* is as in the modification 1-1 shown in FIG. 6 described in the first embodiment.

In this example, the facing surface 3*bf* has both a second outer chamfered portion 42*o* and a second inner chamfered portion 42*i* as the second chamfered portion 42. Unlike this example, the second inner chamfered portion 42*i* may not be present. That is, the facing surface 3*bf* may have only the second outer chamfered portion 42*o*. Each of the second outer chamfered portion 42*o* and the second inner chamfered portion 42*i* may be roundly chamfered or may be linearly chamfered. Each of the second outer chamfered portion 42*o* and the second inner chamfered portion 42*i* of this example is roundly chamfered. The respective second outer chamfered portion 42*o* and second inner chamfered portion 42*i* may have the same shape or may have different shapes. For example, one of the second outer chamfered portion 42*o* and the second inner chamfered portion 42*i* may be roundly chamfered and the other may be linearly chamfered.

The facing surface 3*bf* has surfaces formed by the respective second outer chamfered portion 42*o* and second inner chamfered portion 42*i*. In this example, the facing surface 3*bf* has a flat surface along the Y direction, an arcuate surface formed by the second outer chamfered portion 42*o* and an arcuate surface formed by the second inner chamfered portion 42*i*. The surface formed by the second outer chamfered portion 42*i* is continuous from the flat surface to the outer side edge 3*bo*. The surface formed by the second inner chamfered portion 42*i* is continuous from the flat surface to the inner side edge 3*bi*. In other words, the second outer chamfered portion 42*o* connects the flat surface of the facing surface 3*bf* and the outer side surface of the second part 33*b*. The inner side edge 3*bi* connects the flat surface of the facing surface 3*bf* and the inner side surface of the second part 33*b*.

A chamfer width $F_{21}$ of the second outer chamfered portion 42*o* is larger than a chamfer width $F_{22}$ of the second inner chamfered portion 42*i*. In other words, the chamfer width $F_{22}$ is smaller than the chamfer width $F_{21}$. The chamfer width $F_{22}$ of the second inner chamfered portion 42*i* is a distance along the Y direction between one end of the facing surface 3*bf* connected to the inner side edge 3*bi* and the other end thereof on an opposite side.

The chamfer width $F_{22}$ of the second inner chamfered portion 42*i* is equal to or less than the chamfer width $F_{12}$ of the first inner chamfered portion 41*i*. Since the chamfer width $F_{22}$ of the second inner chamfered portion 42*i* is equal to or less than the chamfer width $F_{12}$ of the first inner chamfered portion 41*i*, the detour of a magnetic flux due to the second inner chamfered portion 42*i* can be avoided. Accordingly, the occurrence of a loss caused by a hindered flow of the magnetic flux between the first and second cores 3*a*, 3*b* is easily suppressed. Further, if the chamfer width $F_{22}$ of the second inner chamfered portion 42*i* is equal to or less than the chamfer width $F_{12}$ of the first inner chamfered portion 41*i*, a contact area of the tip surface 3*af* and the facing surface 3*bf* is easily secured. By securing the contact area of the tip surface 3*af* and the facing surface 3*bf*, the magnetic flux easily flows between the first and second cores 3*a*, 3*b*. Thus, the loss is easily suppressed. The chamfer width $F_{22}$ of the second inner chamfered portion 42*i* may be appropriately set according to the chamfer width $F_{12}$ of the first inner chamfered portion 41*i* and is, for example, 2 mm or less, further 1.5 or less or 1 mm or less. The chamfer width $F_{22}$ of the second inner chamfered portion 42*i* may be zero.

In the modification 3-3, a further weight reduction of the magnetic core 3 (FIG. 10) can be expected by the facing surface 3*bf* having the second inner chamfered portion 42*i* in addition to the second outer chamfered portion 42*o*. This is because the volume of the second core 3*b* is reduced by the second outer chamfered portion 42*o* and the second inner chamfered portion 42*i*. Therefore, the magnetic core 3 can be reduced in weight since the weight of the second core 3*b* is reduced.

Fourth Embodiment

Figure 16:
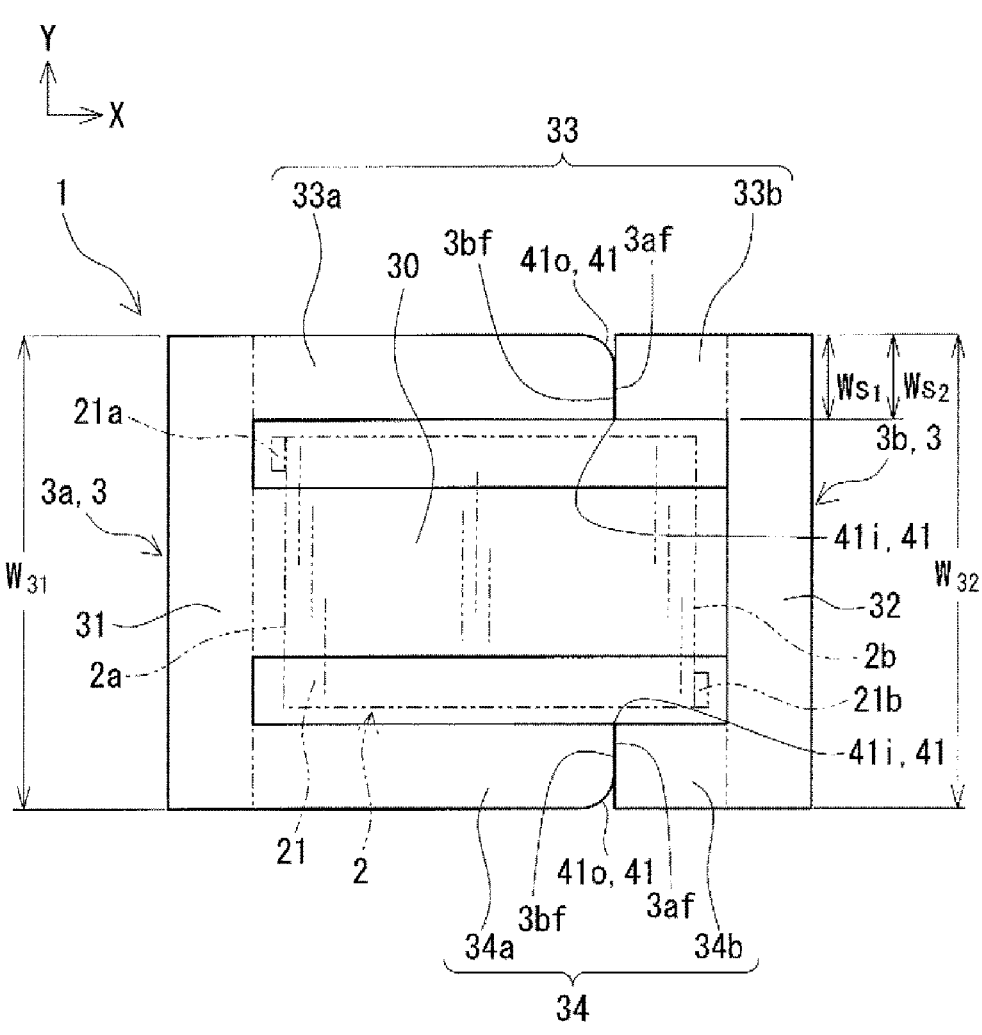
FIG. 16 is a top view showing an outline of an entire reactor according to a fourth embodiment.

A reactor 1 of the fourth embodiment is described with reference to FIG. 16. The reactor 1 of the fourth embodiment differs from the reactor 1 of the third embodiment in that a magnetic core 3 is of an E-U type. The following description is centered on points of difference from the third embodiment. Components similar to those of the third embodiment may not be described.

A first core 3*a* includes a first end core part 31, an entire middle core part 30 and first parts 33*a*, 34*a* of first and second side core parts 33, 34. The first core 3*a* is E-shaped. The first core 3*a* is a compact of a composite material.

A second core 3*b* includes a second end core part 32, second parts 33*b*, 34*b* of the first and second side core parts 33, 34. The second core 3*b* does not include the middle core part 30. The second core 3*b* is U-shaped. The second core 3*b* is a powder compact.

In this embodiment, an end part of the middle core part 30 on the side of the second end core part 32 is in contact with the second end core part 32. Thus, there is substantially no clearance between the middle core part 30 and the second end core part 32 and a gap part is not present. It is also possible to provide a gap part between the middle core part 30 and the second end core part 32 as described in the second embodiment.

[Functions and Effects]

The reactor 1 of the fourth embodiment can reduce a loss similarly to the reactor 1 of the first embodiment. Further, the respective configurations of the modifications 3-1 to 3-3 described as the modifications of the third embodiment are applicable to the fourth embodiment.

Fifth Embodiment

[Converter, Power Conversion Device]

The reactors 1 of the first to fourth embodiments can be used in an application satisfying the following energizing conditions. The energizing conditions include, for example, a maximum direct current of about 100 A or more and 1000 A or less, an average voltage of about 100 V or more and 1000 V or less and a use frequency of about 5 kHz or more and 100 kHz or less. The reactor 1 of the first to fourth embodiments can be typically used as a constituent component of a converter to be installed in a vehicle such as an electric or hybrid vehicle and a constituent component of a power conversion device provided with this converter.

Figure 17:
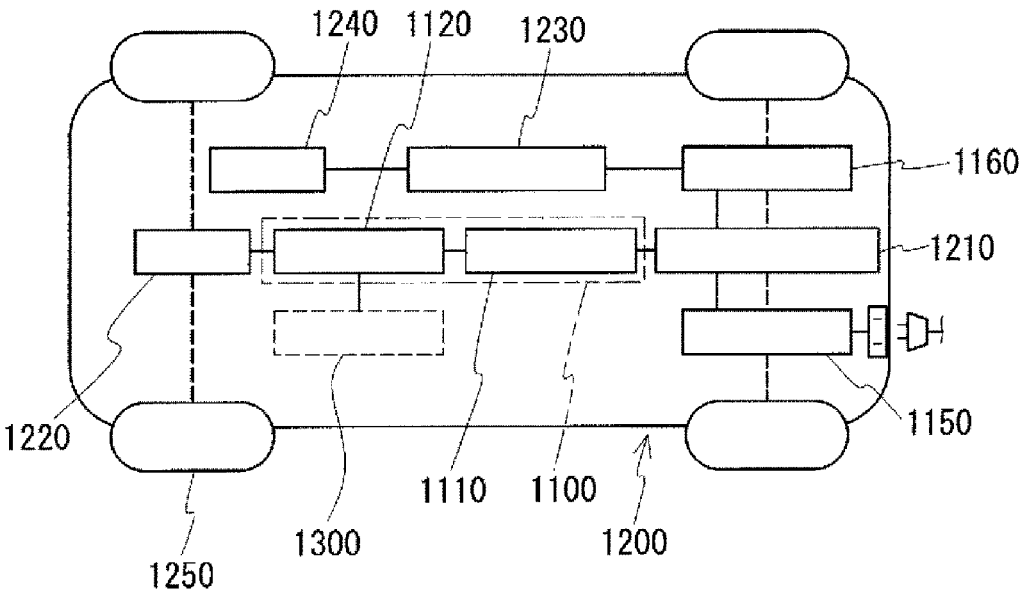
FIG. 17 is a configuration diagram schematically showing a power supply system of a hybrid vehicle.

A vehicle 1200 such as a hybrid or electric vehicle is, as shown in FIG. 17, provided with a main battery 1210, a power conversion device 1100 connected to the main body 1210 and a motor 1220 used for travel by being driven by power supplied from the main body 1210. The motor 1220 is, typically, a three-phase alternating current motor and has a function of driving wheels 1250 during travel and a function as a generator during regeneration. In the case of a hybrid vehicle, the vehicle 1200 includes an engine 1300 in addition to the motor 1220. FIG. 17 shows an inlet as a charging point of the vehicle 1200, but the vehicle 1200 can include a plug.

The power conversion device 1100 includes a converter 1110 to be connected to the main battery 1210 and an inverter 1120 connected to the converter 1110 for the mutual conversion of a direct current and an alternating current. The converter 1110 shown in this example steps up an input voltage of the main battery 1210 of about 200 V or more and 300 V or less to about 400 V or more and 700 V or less and supplies the stepped-up voltage to the inverter 1120 during the travel of the vehicle 1200. The converter 1110 steps down an input voltage output from the motor 1220 via the inverter 1120 to a direct-current voltage suitable for the main battery 1210 and charges the direct-current voltage to the main battery 1210 during regeneration. The input voltage is a direct-current voltage. The inverter 1120 converts the direct current stepped up by the converter 1110 into a predetermined alternating current and supplies the converted current to the motor 1220 during the travel of the vehicle 1200 and converts an alternating current from the motor 1220 into a direct current and outputs the direct current to the converter 1110 during regeneration.

Figure 18:
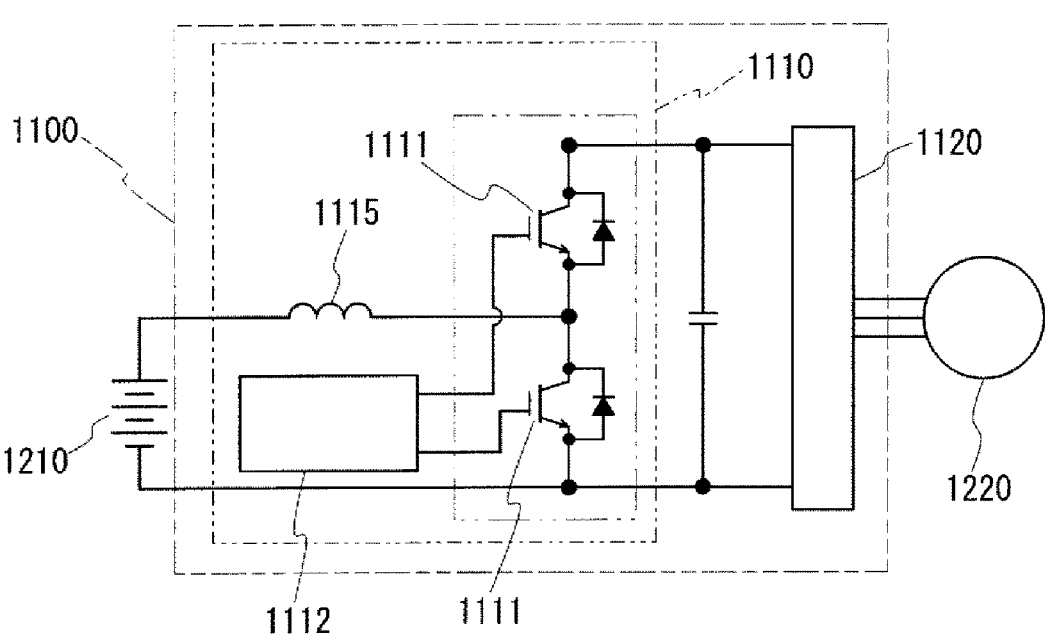
FIG. 18 is a circuit diagram showing an outline of an example of a power conversion device provided with a converter.

The converter 1110 includes a plurality of switching elements 1111, a drive circuit 1112 for controlling the operation of the switching elements 1111 and a reactor 1115 as shown in FIG. 18, and converts an input voltage by being repeatedly turned on and off. The conversion of the input voltage means voltage step-up and-down here. A power device such as a field effect transistor or an insulated gate bipolar transistor is used as the switching element 1111. The reactor 1115 has a function of smoothing a change of a current when the current is increased or decreased by a switching operation, using a property of a coil to hinder a change of a current flowing into a circuit. The reactor 1 of any one of the first to fourth embodiments is provided as the reactor 1115. By including the low-loss reactor 1, efficiency can be expected to be improved in the power conversion device 1100 and the converter 1110.

Besides the converter 1110, the vehicle 1200 is provided with a power supply device converter 1150 connected to the main battery 1210 and an auxiliary power supply converter 1160 connected to a sub-battery 1230 serving as a power source of auxiliary devices and the main battery 1210 and configured to convert a high voltage of the main battery 1210 into a low voltage. The converter 1110 typically performs DC-DC conversion, but the power supply device converter 1150 and the auxiliary power supply converter 1160 perform AC-DC conversion. The power supply device converter 1150 may perform DC-DC conversion. Reactors configured similarly to the reactor 1 of any one of the first to fourth embodiments and appropriately changed in size, shape and the like can be used as reactors of the power supply device converter 1150 and the auxiliary power supply converter 1160. Further, the reactor 1 of any one of the first to fourth embodiments can also be used as a converter for converting input power and only stepping up or only stepping down a voltage.

Test Example 1

An influence on electromagnetic performance was evaluated for a reactor configured similarly to that of the first embodiment described above. A sample of the reactor used in Test Example 1 includes a magnetic core 3 of an E-T type. A relative magnetic permeability $\mu r_1$ of a first core 3*a* is 20. A relative magnetic permeability $\mu r_2$ of a second core 3*b* is 150.

In Test Example 1, Sample No. 1-1 in which a tip surface 3*af* had only a first inner chamfered portion 41*o* and Sample No. 10 in which a tip surface 3*af* had a first outer chamfered portion 41*o* and a first inner chamfered portion 41*i* were evaluated. The sizes of the magnetic core 3 and each main part are shown below.

(Size of Magnetic Core and Main Parts)

Length L of magnetic core 3: 70 mm

Width W of magnetic core 3: 75 mm

Height H of magnetic core 3: 30 mm

Width of middle core part 30=widths of first and second middle core parts 30*a*, 30*b*: 24 mm Lengths of first and second end core parts 31, 32: 12.5 mm Widths $W_{31}$, $W_{32}$ of first and second end core parts 31, 32: 75 mm Widths of first and second side core parts 33, 34=width $Ws_1$ of tip surface 3*af*: 12 mm Width $Ws_2$ of facing surface 3*bf*: 12 mm <Sample No. 1-1>

Chamfer width $F_{11}$ of first outer chamfered portion 41*o*: 4.5 mm

Chamfer width $F_{12}$ of first inner chamfered portion 41*i*: 0 mm

Ratio ($F_{11}/Ws_1$) of chamfer width $F_{11}$ to width $Ws_1$ of tip surface 3*af*: 37.5%

Ratio ($F_{12}$/Ws$_1$) of chamfer width $F_{12}$ to width Ws$_1$ of tip
    surface 3*af*: 0
<Sample No. 10>
    Chamfer width $F_{11}$ of first outer chamfered portion 41*o:*
        2.25 mm
    Chamfer width $F_{12}$ of first inner chamfered portion 41*i:*
        2.25 mm
    Ratio ($F_{11}$/Ws$_1$) of chamfer width $F_{11}$ to width Ws$_1$ of tip
        surface 3*af*: 18.75%
    Ratio ($F_{12}$/Ws$_1$) of chamfer width $F_{12}$ to width Ws$_1$ of tip
        surface 3*af*: 18.75%

In Sample No. 1-1, the chamfer width $F_{11}$ of the first outer chamfered portion 41*o* is larger than the chamfer width $F_{12}$ of the first inner chamfered portion 41*i*. Sample No. 10 is a comparison model in which the chamfer width $F_{11}$ of the first outer chamfered portion 41*o* and the chamfer width $F_{12}$ of the first inner chamfered portion 41*i* are equal.

(Evaluation of Electromagnetic Performance)

Figure 19:
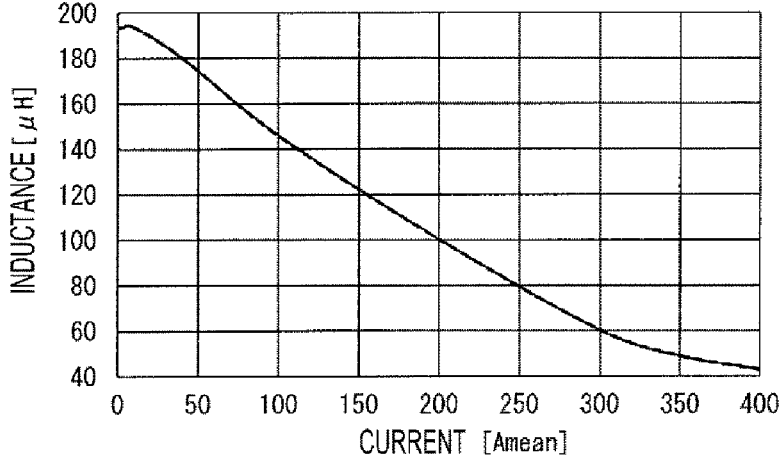
FIG. 19 is a graph showing an inductance analysis result in Test Example 1.

An inductance and a loss were analyzed by computer simulation for the reactor of each sample. JMAG-Designer 19.0 produced by JSOL Corporation, which is a commercially available electromagnetic field analysis software, was used for analysis. For the analysis of the inductance, an inductance when a direct current was caused to flow in a coil was obtained. A current was varied in a range of 0 A to 400 A. Inductances when a current value was 0 A, 100 A, 200 A and 300 A are shown in Table 1. In Table 1, the inductance at each current value in Sample No. 1-1 is shown as a ratio of difference from the inductance at each current value in Sample No. 10. This ratio is shown in percentage with the inductance at each current value in Sample No. 10 set at 100. Further, a graph of inductance obtained by the analysis is shown in FIG. 19. A horizontal axis represents a current (Amean) in the graph of FIG. 19. A vertical axis represents an inductance (μH) in the graph of FIG. 19. In FIG. 19, a broken-line graph curve represents an inductance of Sample No. 10. In FIG. 19, a solid-line graph curve represents an inductance of Sample No. 1-1.

In the analysis of the loss, a total loss was obtained when the reactor was driven under conditions including a direct current of 0 A, an input voltage of 300 V, an output voltage of 600 V and a frequency of 20 kHz. The total loss includes an iron loss of the magnetic core, a loss in the coil and the like. A result of that is shown in Table 1. In Table 1, the total loss of Sample No. 1-1 is shown as a ratio of difference from the total loss of Sample No. 10. This ratio is shown in percentage with the loss of Sample No. 10 set to 100.

(Evaluation of Weight Reduction Effect)

A weight reduction effect of the magnetic core was evaluated for the reactor of Sample No. 1-1. Here, a reduction amount of the volume of the first core in Sample No. 1-1 from the volume of the first core in Sample No. 10 was calculated. A volume reduction amount is obtained by subtracting the volume of the first core of Sample No. 1-1 from that of the first core of Sample No. 10. A result of that is shown in Table 1. Further, a mass ratio of the first core of Sample No. 1-1 to the first core of Sample No. 10 was calculated. The mass ratio shows a ratio of the mass of the first core of Sample No. 1-1 to that of the first core of Sample No. 10 in percentage. The mass ratio is also shown in Table 1.

TABLE 1

|  |  | Sample No. | |
| --- | --- | --- | --- |
| Item | Unit | 10 | 1-1 |
| $F_{11}$ | mm | 2.25 | 4.5 |
| $F_{12}$ | mm | 2.25 | 0 |
| Inductance    0 A | % | — | +0.1 |
| 100 A | | — | +0.1 |
| 200 A | | — | +0.1 |
| 300 A | | — | −0.2 |
| Total Loss | % | — | −0.9 |
| Volume Reduction Amount | mm$^3$ | — | 130 |
| Mass Ratio | % | — | 99.9 |

As shown in Table 1 and FIG. 19, an inductance characteristic of Sample No. 1-1 is substantially the same as that of Sample No. 10. Specifically, as shown in Table 1, the inductance at each current value of 0 A to 300 A in Sample No. 1-1 is within ±2.5%, further within ±1.5% and particularly within ±0.5% of the inductance at each current value in Sample No. 10. Thus, Sample No. 1-1 can be said to have the inductance characteristic equivalent to that of Sample No. 10. That is, Sample No. 1-1 can sufficiently maintain a predetermined inductance. Thus, in Sample No. 1-1, the chamfer width of the first outer chamfered portion hardly affects the inductance. Further, from the result of Table 1, a loss of Sample No. 1-1 is less than that of Sample No. 10.

Further, Sample No. 1-1 can reduce the weight of the first core by 0.1% as compared to Sample No. 10.

Test Example 2

In Test Example 2, an influence on electromagnetic performance given by the chamfer width $F_{11}$ was examined while changing the chamfer width $F_{11}$ of the first outer chamfered portion 41*o*. Specifically, evaluations similar to those of Test Example 1 were conducted for reactors of Samples No. 2-1 to No. 2-6 in which the chamfer width $F_{11}$ of the first outer chamfered portion 41*o* was set in a range of 2.4 mm to 6 mm. Sample No. 2-3 is the same as Sample No. 1-1 of Test Example 1. Samples No. 2-1 to No. 2-6 are different only in the chamfer width $F_{11}$ of the first outer chamfered portion 41*o*.

An inductance and a total loss were obtained in the same manner as in Test Example 1 for the reactor of each sample. A result of that is shown in Table 2. In Table 2, the inductances at each current value in Samples No. 2-1 to No. 2-6 are shown as ratios of difference from the inductance at each current value in Sample No. 10. The total losses of Samples No. 2-1 to No. 2-6 are shown as ratios of difference from the total loss of Sample No. 10. Further, as in Test Example 1, volume reduction amounts and mass ratios of the first cores in Samples No. 2-1 to No. 2-6 from and to the first core in Sample No. 10 are shown in Table 2.

TABLE 2

| Item | Unit | Sample No. | | | | | | |
|---|---|---|---|---|---|---|---|---|
| | | 10 | 2-1 | 2-2 | 2-3 | 2-4 | 2-5 | 2-6 |
| $F_{11}$ | mm | 2.25 | 2.4 | 3 | 4.5 | 5 | 5.4 | 6 |
| $F_{12}$ | mm | 2.25 | 0 | 0 | 0 | 0 | 0 | 0 |
| $F_{11}/Ws_1$ | % | 18.75 | 20 | 25 | 37.5 | 41.67 | 45 | 50 |
| Inductance          0 A | % | — | +0.4 | +0.4 | +0.1 | −0.1 | −0.3 | −0.6 |
| 100 A | | — | +0.4 | +0.3 | +0.1 | +0.0 | −0.1 | −0.3 |
| 200 A | | — | +0.1 | +0.0 | +0.1 | +0.1 | +0.2 | +0.4 |
| 300 A | | — | −0.4 | −0.4 | −0.2 | +0.0 | +0.2 | +0.4 |
| Total Loss | % | — | −0.6 | −0.6 | −0.9 | −1.1 | −1.2 | −1.4 |
| Volume Reduction Amount | mm³ | — | −56 | −14 | 130 | 192 | 245 | 333 |
| Mass Ratio | % | — | 100.1 | 100 | 99.9 | 99.8 | 99.7 | 99.6 |

As shown in Table 2, as the chamfer width $F_{11}$ of the first outer chamfered portion becomes larger than the chamfer width $F_{12}$ of the first inner chamfered portion, the loss is reduced. That is, a loss reduction effect increases. Further, the larger the chamfer width $F_{11}$, the larger the volume reduction amount of the first core. That is, the weight reduction effect increases. However, if the chamfer width $F_{11}$ is excessively increased, the inductance characteristic tends to be deteriorated. Specifically, a variation from the inductance at each current value of 0 A to 300 A in Sample No. 10 becomes larger. That is, it becomes difficult to maintain an inductance characteristic equivalent to that of Sample No. 10. Since a variation range from the inductance at each current value of 0 A to 300 A in Sample No. 10 is within ±0.5% in Samples No. 2-1 to No. 2-5, a predetermined inductance characteristic can be substantially maintained. From this, the ratio ($F_{11}/Ws_1$) of the chamfer width $F_{11}$ to the width $Ws_1$ of the tip surface is thought to be preferably 10% or more and 45% or less, further 20% or more. Further, if not only the loss reduction effect, but also the weight reduction effect is considered, the ratio ($F_{11}/Ws_1$) is thought to be preferably higher than 25%.

Test Example 3

In Test Example 3, an influence on electromagnetic performance given by the chamfer width $F_{12}$ was examined while changing the chamfer width $F_{12}$ of the first inner chamfered portion 41i. Specifically, evaluations similar to those of Test Example 1 were conducted for reactors of Samples No. 3-1 to No. 3-4 in which the chamfer width $F_{12}$ of the first inner chamfered portion 41i was set in a range of 0 mm to 2 mm. Sample No. 3-1 is the same as Sample No. 1-1 of Test Example 1. Samples No. 3-1 to No. 3-4 are different only in the chamfer width $F_{12}$ of the first inner chamfered portion 41i.

An inductance and a total loss were obtained in the same manner as in Test Example 1 for the reactor of each sample. A result of that is shown in Table 3. In Table 3, the inductances at each current value in Samples No. 3-1 to No. 3-4 are shown as ratios of difference from the inductance at each current value in Sample No. 10. The total losses of Samples No. 3-1 to No. 3-4 are shown as ratios of difference from the total loss of Sample No. 10. Further, as in Test Example 1, volume reduction amounts and mass ratios of the first cores in Samples No. 3-1 to No. 3-4 from and to the first core in Sample No. 10 are shown in Table 3.

TABLE 3

| Item | Unit | Sample No. | | | | |
|---|---|---|---|---|---|---|
| | | 10 | 3-1 | 3-2 | 3-3 | 3-4 |
| $F_{11}$ | mm | 2.25 | 4.5 | 4.5 | 4.5 | 4.5 |
| $F_{12}$ | mm | 2.25 | 0 | 1 | 1.5 | 2 |
| $F_{12}/Ws_1$ | % | 18.75 | 0 | 8.33 | 12.5 | 16.67 |
| Inductance          0 A | % | — | +0.1 | −0.1 | −0.2 | −0.3 |
| 100 A | | — | +0.1 | +0.0 | −0.1 | −0.2 |
| 200 A | | — | +0.1 | +0.1 | +0.0 | +0.0 |
| 300 A | | — | −0.2 | +0.0 | +0.1 | +0.3 |
| Total Loss | % | — | −0.9 | −0.7 | −0.5 | −0.4 |
| Volume Reduction Amount | mm³ | — | 130 | 143 | 159 | 182 |
| Mass Ratio | % | — | 99.9 | 99.8 | 99.8 | 99.8 |

As shown in Table 3, it is understood that as the chamfer width $F_{12}$ of the first inner chamfered portion decreases, the loss is reduced and the occurrence of the loss is more easily suppressed. Samples No. 3-1 to No. 3-3 can reduce the loss by 0.5% or more as compared to Sample No. 10. From this, the ratio ($F_{12}/Ws_1$) of the chamfer width $F_{12}$ to the width $Ws_1$ of the tip surface is thought to be preferably 12.5% or less, further 10% or less.

Test Example 4

In Test Example 4, an influence on electromagnetic performance given by a reduction amount of the width $Ws_2$ of the facing surface 3bf from the width $Ws_1$ of the tip surface 3af was examined while changing the width $Ws_2$. Specifically, evaluations similar to those of Test Example 1 were conducted for reactors of Samples No. 4-1 to No. 4-5 in which the width $Ws_2$ of the facing surface 3bf was made shorter than the width $Ws_1$ of the tip surface 3af in a range of 1 mm to 5 mm. Samples No. 4-1 to No. 4-5 are different only in the width $Ws_2$ of the facing surface 3bf. Samples No. 4-1 to No. 4-5 are similar to Sample No. 1-1 of Test Example 1 except that the width $Ws_2$ of the facing surface 3bf is different.

The widths $Ws_2$ of the facing surfaces 3bf of Samples No. 4-1 to No. 4-5 are respectively 11 mm, 10 mm, 9 mm, 8 mm and 7 mm. That is, the widths $W_{32}$ of the second end core parts 32 of Samples No. 4-1 to No. 4-5 are respectively 73 mm, 71 mm, 69 mm, 67 mm and 65 mm. A difference ($Ws_1$-$Ws_2$) between the widths $Ws_1$ and $Ws_2$ and a ratio ($Ws_2/Ws_1$) of the width $Ws_2$ to the width $Ws_1$ in each sample are respectively shown in Table 4.

An inductance and a total loss were obtained in the same manner as in Test Example 1 for the reactor of each sample. A result of that is shown in Table 4. In Table 4, the inductances at each current value in Samples No. 4-1 to No.

4-5 are shown as ratios of difference from the inductance at each current value in Sample No. 10. The total losses of Samples No. 4-1 to No. 4-5 are shown as ratios of difference from the total loss of Sample No. 10.

(Evaluation of Weight Reduction Effect)

Further, a weight reduction effect of the magnetic core was evaluated for the reactors of Samples No. 4-1 to No. 4-5. Here, reduction amounts of the volumes of the second cores in Samples No. 4-1 to No. 4-5 from the volume of the second core in Sample No. 10 were calculated. Volume reduction amounts are obtained by subtracting the volumes of the second cores of Samples No. 4-1 to No. 4-5 from that of the second core of Sample No. 10. A result of that is shown in Table 4. Further, mass ratios of the second cores of Samples No. 4-1 to No. 4-5 to the second core of Sample No. 10 were calculated. The mass ratios show ratios of the masses of the second cores of Samples No. 4-1 to NO. 4-5 to that of the second core of Sample No. 10 in percentage. The mass ratios are also shown in Table 1.

TABLE 4

| Item | Unit | Sample No. | | | | | |
|---|---|---|---|---|---|---|---|
| | | 10 | 4-1 | 4-2 | 4-3 | 4-4 | 4-5 |
| $F_{11}$ | mm | 2.25 | 4.5 | 4.5 | 4.5 | 4.5 | 4.5 |
| $F_{12}$ | mm | 2.25 | 0 | 0 | 0 | 0 | 0 |
| $Ws_1-Ws_2$ | mm | 0 | 1 | 2 | 3 | 4 | 5 |
| $Ws_2/Ws_1$ | % | 100 | 92 | 83 | 75 | 67 | 58 |
| Inductance 0 A | % | — | 0.2 | −0.6 | −1.2 | −2.1 | −3.1 |
| 100 A | | — | −0.2 | −0.6 | −1.1 | −2.0 | −2.9 |
| 200 A | | — | +0.0 | −0.1 | −0.4 | −0.4 | −0.6 |
| 300 A | | — | +0.1 | +0.5 | +1.1 | +2.1 | +3.3 |
| Total Loss | % | — | −0.9 | −0.9 | −1.1 | −1.2 | −1.2 |
| Volume Reduction Amount | $mm^3$ | — | 750 | 1500 | 2250 | 3000 | 3750 |
| Mass Ratio | % | — | 98 | 96 | 94 | 92 | 90 |

As shown in Table 4, as the width $Ws_2$ of the facing surface becomes shorter than the width $Ws_1$ of the tip surface, i.e. as the difference $(Ws_1-Ws_2)$ between the widths $Ws_1$ of the tip surface and the $Ws_2$ of the facing surface increases, the volume reduction amount of the second core increases. That is, the weight reduction effect increases. However, if the width $Ws_2$ of the facing surface becomes even shorter, the deterioration of the inductance characteristic becomes notable accordingly. Specifically, a variation from the inductance at each current value of 0 A to 300 A in Sample No. 10 becomes larger. That is, it becomes difficult to maintain an inductance characteristic equivalent to that of Sample No. 10. As is understood from Table 4, as the width $Ws_2$ of the facing surface is made shorter, the volume reduction amount of the second core increases at a fixed rate, whereas an inductance variation range increases at a rate larger than an increasing rate of the volume reduction amount. Since a variation range from the inductance at each current value of 0 A to 300 A in Sample No. 10 is within ±2.5% in Samples No. 4-1 to No. 4-4, a predetermined inductance characteristic can be substantially maintained. Particularly, the inductance variation range from Sample No. 10 is ±1.5% in Samples No. 4-1 to No. 4-3, a predetermined inductance characteristic can be more satisfactorily maintained. From this, the ratio $(Ws_2/Ws_1)$ of the width $Ws_2$ of the facing surface to the width $Ws_1$ of the tip surface is thought to be preferably 60% or more, further 70% or more. Further, if not only the loss reduction effect, but also the weight reduction effect is considered, the ratio $(Ws_2/Ws_1)$ is thought to be preferably 92% or less, further 90% or less.

Text Example 5

An influence on electromagnetic performance was evaluated for reactors configured similarly to the third embodiment described above. Samples of the reactors used in Test Example 5 include a magnetic core 3 of an E-E type. A relative magnetic permeability $\mu r_1$ of a first core 3a is 20. A relative magnetic permeability $\mu r_2$ of a second core 3b is 150.

In Test Example 5, Samples No. 5-1 to No. 5-3 in which a tip surface 3af has only a first outer chamfered portion 41o and Sample No. 50 in which a tip surface 3af has a first outer chamfered portion 41o and a first inner chamfered portion 41i were evaluated. In Samples No. 5-1 to No. 5-3, a chamfer width $F_{11}$ of the first outer chamfered portion 41o was set in a range of 5 mm to 6 mm. Samples No. 5-1 to No. 5-3 are different only in the chamfer width $F_{11}$ of the first outer chamfered portion 41o. The sizes of the magnetic core 3 and each main part are shown below.

(Sizes of Magnetic Core and Main Parts)

Length L of magnetic core 3: 70 mm

Width W of magnetic core 3: 75 mm

Height H of magnetic core 3: 30 mm

Width of middle core part 30=widths of first and second middle core parts 30a, 30b: 24 mm Lengths of first and second end core parts 31, 32: 12.5 mm Widths $W_{31}$, $W_{32}$ of first and second end core parts 31, 32: 75 mm Widths of first parts 33a, 34a of first and second side core parts 33, 34=width $Ws_1$ of tip surface 3af: 12 mm Widths of first parts 33b, 34b of first and second side core parts 33, 34=width $Ws_2$ of facing surface 3bf: 12 mm In Samples No. 5-1 to No. 5-3, the chamfer width $F_{11}$ of the first outer chamfered portion 41o is larger than the chamfer width $F_{12}$ of the first inner chamfered portion 41i. In any of Samples No. 5-1 to No. 5-3, the chamfer width $F_{12}$ of the first inner chamfered portion 41i is 0 mm. Sample No. 50 is a comparison model in which the chamfer width $F_{11}$ of the first outer chamfered portion 41o and the chamfer width $F_{12}$ of the first inner chamfered portion 41i are equal. In Sample No. 50, the chamfer widths $F_{11}$, $F_{12}$ of the first outer chamfered portion 41o and the first inner chamfered portion 41i are 2.25 mm.

An inductance and a total loss were obtained in the same manner as in Test Example 1 for the reactor of each sample. A result of that is shown in Table 5. In Table 5, the inductances at each current value in Samples No. 5-1 to No. 5-3 are shown as ratios of difference from the inductance at each current value in Sample No. 50. The total losses of Samples No. 5-1 to No. 5-3 are shown as ratios of difference from the total loss of Sample No. 50. Further, volume reduction amounts and mass ratios of the first cores in Samples No. 5-1 to No. 5-3 from and to the first core in Sample No. 50 are shown in Table 5.

TABLE 5

| Item | Unit | Sample No. | | | |
|---|---|---|---|---|---|
| | | 50 | 5-1 | 5-2 | 5-3 |
| $F_{11}$ | mm | 2.25 | 5 | 5.4 | 6 |
| $F_{12}$ | mm | 2.25 | 0 | 0 | 0 |
| $F_{11}/Ws_1$ | % | 18.75 | 41.67 | 45 | 50 |

TABLE 5-continued

| Item | | Unit | Sample No. | | | |
|---|---|---|---|---|---|---|
| | | | 50 | 5-1 | 5-2 | 5-3 |
| Inductance | 0 A | % | — | −0.2 | −0.4 | −0.7 |
| | 100 A | | — | +0.0 | −0.1 | −0.3 |
| | 200 A | | — | +0.2 | +0.3 | +0.4 |
| | 300 A | | — | +0.0 | +0.1 | +0.4 |
| Total Loss | | % | — | −0.1 | −0.3 | −0.4 |
| Volume Reduction Amount | | mm³ | — | 192 | 245 | 333 |
| Mass Ratio | | % | — | 99.8 | 99.7 | 99.6 |

As shown in Table 5, even if the magnetic core is of the E-E type, the loss is reduced as the chamfer width $F_{11}$ of the first outer chamfered portion increases as in the case of the E-T type of Test Example 2 described above. That is, the loss reduction effect increases. Further, as the chamfer width $F_{11}$ increases, the volume reduction amount of the first core increases. That is, the weight reduction effect increases. However, if the chamfer width $F_{11}$ is made excessively large, the inductance characteristic tends to be deteriorated. Specifically, a variation from the inductance at each current value of 0 A to 300 A in Sample No. 50 becomes larger. That is, it becomes difficult to maintain the inductance characteristic equivalent to that of Sample No. 50. Since a variation range from the inductance at each current value of 0 A to 300 A in Sample No. 50 is within ±0.5% in Samples No. 5-1 and No. 5-2, a predetermined inductance characteristic can be substantially maintained. From this, the ratio $(F_{11}/Ws_1)$ of the chamfer width $F_{11}$ to the width $Ws_1$ of the tip surface is thought to be preferably 40% or more and 45% or less in the magnetic core of the E-E type.

LIST OF REFERENCE NUMERALS

1 reactor
2 coil
2a first end surface,
2b second end surface
21 winding portion,
21a, 21b end part
3 magnetic core
3a first core,
3b second core
30 middle core part
30a first middle core part,
31b second middle core part
31 first end core part,
32 second end core part
33 first side core part,
34 second side core part
33a, 34a first part,
33b, 34b second part
3af tip surface, 3bf facing surface
3ao, 3bo outer side edge
3ai, 3bi inner side edge
41 first chamfered portion
41o first outer chamfered portion,
41i first inner chamfered portion
42 second chamfered portion
42o second outer chamfered portion,
42i second inner chamfered portion
$F_{11}$, $F_{12}$, $F_{21}$, $F_{22}$ chamfer width
W, $Ws_1$, $Ws_2$, $W_{31}$, $W_{32}$ width
L length
H height
1100 power conversion device

1110 converter
1111 switching element
1112 drive circuit
1115 reactor
1120 inverter
1150 power supply device converter
1160 auxiliary power supply converter
1200 vehicle
1210 main battery
1220 motor
1230 sub-battery
1240 auxiliary devices
1250 wheel
1300 engine

What is claimed is:

1. A reactor, comprising:

a coil; and a magnetic core, the magnetic core including a first core and a second core formed into a θ shape by being combined in an X direction, the first core including a first end core part, at least a part of a middle core part and at least parts of both side core parts including a first side core part and a second side core part, the second core including a second end core part, a remaining part of the middle core part and remaining parts of the first and second side core parts, the first end core part facing a first end surface of the coil, the second end core part facing a second end surface of the coil, the middle core part being arranged inside the coil, the first and second side core parts being arranged outside the coil to sandwich the middle core part, each of the first and second side core parts of the first core having a tip surface facing the second core, a surface of the second core having facing surfaces facing the tip surfaces, an outer side edge of the facing surface being located inwardly of an outer side edge of the tip surface in a Y direction or aligned with the outer side edge of the tip surface in the Y direction and an inner side edge of the facing surface and that of the tip surface being substantially aligned in the Y direction when the magnetic core is viewed from a Z direction, the tip surface having a first chamfered portion along the Z direction, the first chamfered portion including at least a first outer chamfered portion, out of the first outer chamfered portion connected to the outer side edge of the tip surface and a first inner chamfered portion connected to the inner side edge of the tip surface, a chamfer width of the first outer chamfered portion being larger than that of the first inner chamfered portion, the X direction being a direction along an axial direction of the middle core part, the Y direction being a parallel direction of the middle core part, the first side core part and the second side core part, the Z direction being a direction orthogonal to both the X direction and the Y direction, the outer side edge of the facing surface being located inwardly in the Y direction of the outer side edge of the tip surface, and a width in the Y direction of the facing surface being shorter than a width in the Y direction of the tip surface.

2. The reactor of claim 1, wherein the chamfer width of the first outer chamfered portion is 10% or more and 45% or less of a width in the Y direction of the tip surface.

3. The reactor of claim 1, wherein the chamfer width of the first inner chamfered portion is 12.5% or less of a width in the Y direction of the tip surface.

4. The reactor of claim 1, wherein the chamfer width of the first inner chamfered portion is 2 mm or less.

5. The reactor of claim 1, wherein the first outer chamfered portion is roundly chamfered.

6. The reactor of claim 1, wherein:

the first core is a compact of a composite material, a soft magnetic powder being dispersed in a resin in the composite material, and the second core is a powder compact made of a raw powder containing a soft magnetic powder.

7. The reactor of claim 1, wherein a relative magnetic permeability of the first core is 5 or more and 50 or less.

8. The reactor of claim 1, wherein a relative magnetic permeability of the second core is 50 or more and 500 or less.

9. The reactor of claim 1, wherein the relative magnetic permeability of the second core is higher than that of the first core.

10. The reactor of claim 1, wherein the width in the Y direction of the facing surface is 60% or more and 92% or less of the width in the Y direction of the tip surface.

11. The reactor of claim 1, wherein:

the facing surface has a second chamfered portion along the Z direction, the second chamfered portion includes at least a second outer chamfered portion, out of the second outer chamfered portion connected to the outer side edge of the facing surface and a second inner chamfered portion connected to the inner side edge of the facing surface, and a chamfer width of the second outer chamfered portion is larger than that of the second inner chamfered portion.

12. The reactor of claim 1, wherein:

the first core includes each of the first and second side core parts entirely, and the facing surfaces are provided on the second end core part of the second core.

13. The reactor of claim 1, wherein:

the first core includes a part of each of the first and second side core parts, and the facing surface is provided on the remaining part of each of the first and second side core parts of the second core.

14. A converter, comprising the reactor of claim 1.

15. A power conversion device, comprising the converter of claim 14.

\*  \*  \*  \*  \*